US009790928B2

(12) United States Patent
Wang et al.

(10) Patent No.: US 9,790,928 B2
(45) Date of Patent: Oct. 17, 2017

(54) TRIBOELECTRIC GENERATORS AND SENSORS

(71) Applicants: Zhong Lin Wang, Atlanta, GA (US); Sihong Wang, Atlanta, GA (US); Guang Zhu, Atlanta, GA (US); Yusheng Zhou, Atlanta, GA (US); Jun Chen, Atlanta, GA (US); Peng Bai, Atlanta, GA (US)

(72) Inventors: Zhong Lin Wang, Atlanta, GA (US); Sihong Wang, Atlanta, GA (US); Guang Zhu, Atlanta, GA (US); Yusheng Zhou, Atlanta, GA (US); Jun Chen, Atlanta, GA (US); Peng Bai, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 493 days.

(21) Appl. No.: 14/447,132

(22) Filed: Jul. 30, 2014

(65) Prior Publication Data
US 2014/0338458 A1    Nov. 20, 2014

Related U.S. Application Data

(63) Continuation-in-part of application No. 14/032,864, filed on Sep. 20, 2013, now Pat. No. 9,595,894, and
(Continued)

(51) Int. Cl.
| | |
|---|---|
| *H02N 1/04* | (2006.01) |
| *F03G 5/06* | (2006.01) |
| *G01L 1/00* | (2006.01) |
| *G01H 11/06* | (2006.01) |
| *H02J 7/00* | (2006.01) |
| *H02J 7/34* | (2006.01) |

(52) U.S. Cl.
CPC ............... *F03G 5/06* (2013.01); *G01H 11/06* (2013.01); *G01L 1/005* (2013.01); *H02J 7/007* (2013.01); *H02J 7/345* (2013.01); *H02N 1/04* (2013.01)

(58) Field of Classification Search
CPC .. H02N 1/04; H02N 1/06; H02N 1/10; H02N 1/00
See application file for complete search history.

(56) References Cited

U.S. PATENT DOCUMENTS 2,892,412 A * 6/1959 Mullins ................... F42C 11/00
102/207
4,126,822 A    11/1978 Wahlstrom
(Continued)

OTHER PUBLICATIONS

ISA: "Notification of Transmittal of the International Search Report and the Written Opinion of the International Searching Authority, or the Declaration"; WIPO Feb. 22, 2013.
(Continued)

*Primary Examiner* — Dang Le
(74) *Attorney, Agent, or Firm* — Bryan W. Bockhop

(57) ABSTRACT

A triboelectric power system includes a triboelectric generator, a rechargeable energy storage unit and a power management circuit. The rechargeable energy storage unit is associated to the triboelectric generator. The power management circuit is configured to receive an input current from the triboelectric generator and to deliver an output current corresponding to the input current to the rechargeable battery so that the output current has a current direction and a voltage that will recharge the rechargeable battery.

17 Claims, 10 Drawing Sheets

Related U.S. Application Data a continuation-in-part of application No. 14/189,656, filed on Feb. 25, 2014.

(60) Provisional application No. 61/859,808, filed on Jul. 30, 2013, provisional application No. 61/863,627, filed on Aug. 8, 2013, provisional application No. 61/859,843, filed on Jul. 30, 2013, provisional application No. 61/897,447, filed on Oct. 30, 2013, provisional application No. 61/704,138, filed on Sep. 21, 2012, provisional application No. 61/754,992, filed on Jan. 22, 2013, provisional application No. 61/771,371, filed on Mar. 1, 2013.

(56) References Cited

U.S. PATENT DOCUMENTS

| 4,990,813 | A | 2/1991 | Paramo |
|---|---|---|---|
| 2006/0064826 | A1 | 3/2006 | Kimball |
| 2010/0133006 | A1 | 6/2010 | Shakra et al. |
| 2011/0050181 | A1* | 3/2011 | Post .................... H02N 1/04 320/166 |

OTHER PUBLICATIONS

Notification of Related Application: U.S. Appl. No. 13/598,132, filed Aug. 29, 2012 by Wang et al. and commonly owned by the assignee of the present application includes subject matter that may be related to the present application.

Zhu, Guang: "Triboelectric-Generator-Driven Pulse Electrodeposition for Micropatterning"; Nano Letters, Aug. 13, 2012; ACS.

Notification of Related Application: U.S. Appl. No. 14/2508,630, filed Apr. 22, 2014 by Wang et al. and commonly owned by the assignee of the present application includes subject matter that may be related to the present application.

Notification of Related Application: U.S. Appl. No. 14/314,131, filed Jun. 25, 2014 by Wang et al. and commonly owned by the assignee of the present application includes subject matter that may be related to the present application.

* cited by examiner

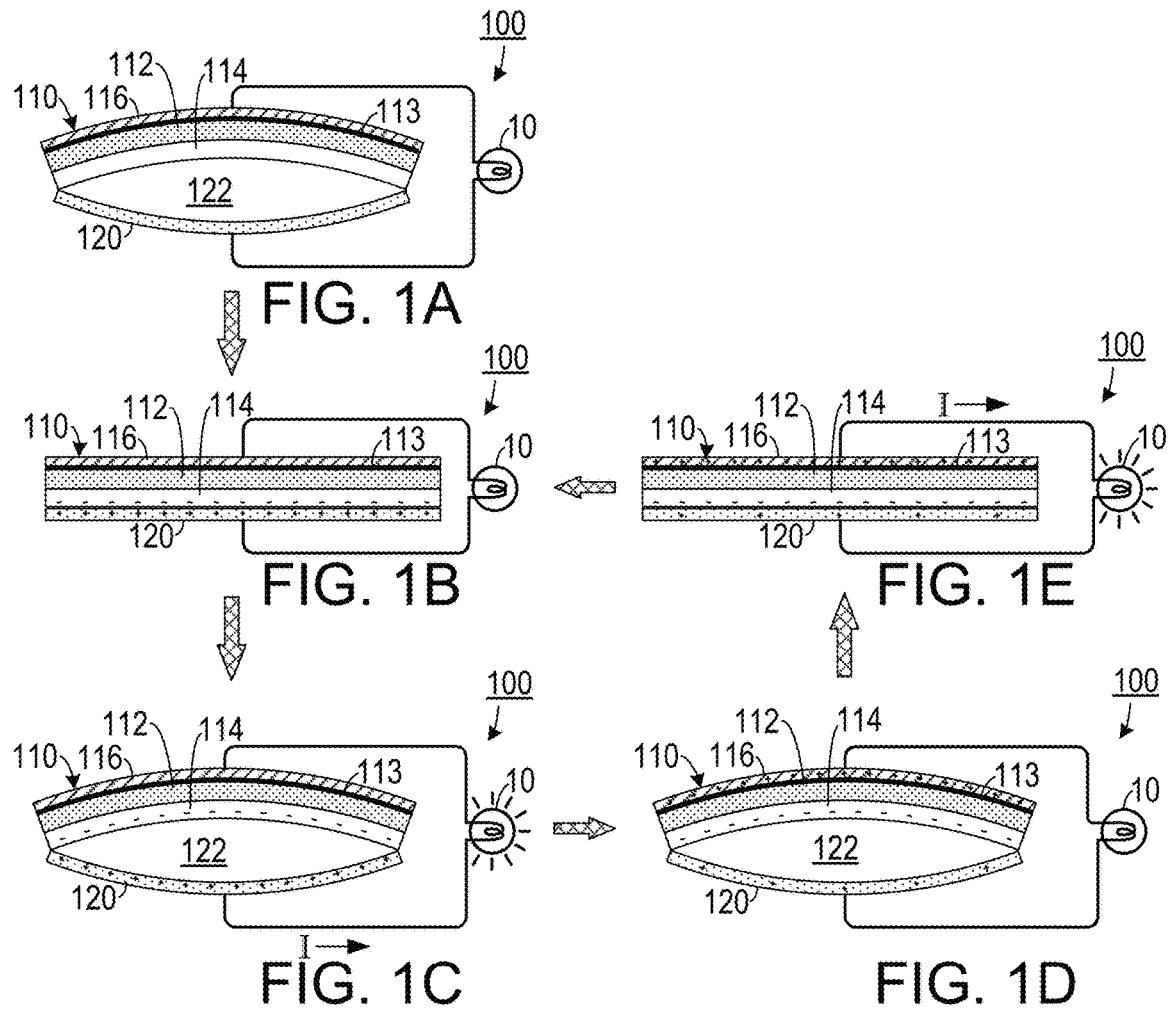
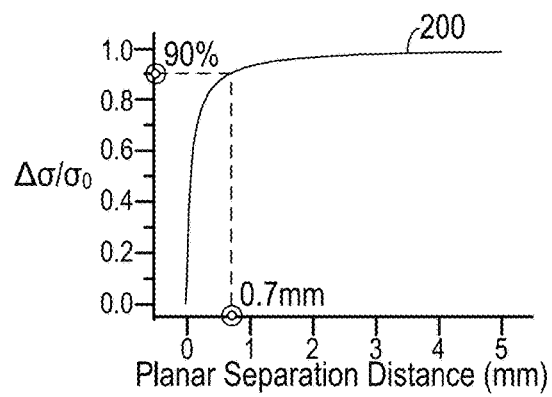

TRIBOELECTRIC GENERATORS AND SENSORS

CROSS-REFERENCE TO RELATED APPLICATION(S)

This application claims the benefit of the following U.S. Provisional Patent Application Ser. Nos. 61/859,808, filed Jul. 30, 2013; 61/863,627, filed Aug. 8, 2013; 61/859,843, filed Jul. 30, 2013; and 61/897,447, filed Oct. 30, 2013, the entirety of each which is hereby incorporated herein by reference. This application is a continuation-in-part of, and claims the benefit of, U.S. patent application Ser. No. 14/032,864, filed Sep. 20, 2013, which is a non-provisional of 61/704,138, filed Sep. 21, 2012 and 61/754,992, filed Jan. 22, 2013, the entirety of each of which is hereby incorporated herein by reference. This application is also a continuation-in-part of, and claims the benefit of, U.S. patent application Ser. No. 14/189,656, filed Feb. 25, 2014, which is a non-provisional of 61/771,371, filed Mar. 1, 2013, the entirety of each of which is hereby incorporated herein by reference.

STATEMENT OF GOVERNMENT INTEREST

This invention was made with government support under agreement No. DE-FG02-07ER46394, awarded by the Department of Energy, and under agreement No. CMMI-0946418, awarded by the National Science Foundation. The government has certain rights in the invention.

BACKGROUND OF THE INVENTION

1. Field of the Invention

The present invention relates to electric power generators and, more specifically, to generators that derive power from mechanical contact between surfaces.

2. Description of the Related Art

Wireless, portable and multi-function electronic devices require independent and maintenance-free power sources. The emerging technologies for mechanical energy harvesting are effective and promising approaches for building self-powered systems, because of a great abundance of mechanical energy existing in the environment and the human body. Piezoelectric nanogenerators have been developed to convert tiny-scale mechanical energy into electricity. Another approach to providing power is though triboelectric nanogenerators based on the contact-electrification effect. Triboelectric nanogenerators harvest mechanical energy through a periodic contact and separation of two polymer plates. However, most triboelectric nanogenerators have limited power output.

Energy harvesting by converting ambient energy into electricity may offset the reliance of small portable electronics on traditional power supplies, such as batteries. When long-term operation of a large number of electronic devices in dispersed locations is required, energy harvesting has the advantages of outstanding longevity, relatively little maintenance, minimal disposal and contamination.

When two materials, at least one of which is non-conducting, come into contact with each other, a chemical bond, known as adhesion, is formed between the two materials. Depending on the triboelectric properties of the materials, one material may "capture" some of the electrons from the other material. If the two materials are separated from each other, a charge imbalance will occur. The material that captured the electron will negatively charged and the material that lost an electron will be positively charged. This charge imbalance gives rise to what is sometimes referred to as "static electricity." The term "static" in this case is somewhat deceptive, as it implies a lack of motion when in reality motion is necessary for charge imbalances to flow. The spark one feels upon touching a door knob is an example of such flow.

The triboelectric effect is a type of contact electrification in which certain materials become electrically charged after they come into contact with another such as through friction. It is the mechanism though which static electricity is generated. The triboelectric effects associated electrostatic phenomena are the most common electrical phenomena in daily life, from walking to driving. However, the triboelectric effect has been largely ignored as an energy source for electricity. Some electrostatic micro-generators have been developed and used in research relating to micro-electromechanical systems (MEMS), but such designs rely on an extra voltage source to charge electrode plates instead of harnessing triboelectric effect, leading to complicated structures and fabrication processes.

Previously demonstrated triboelectric generators require periodic contact and vertical separation of two materials that have opposite triboelectric polarities, making it only applicable to harvest energy from intermittent impact or shock. Such systems typically include a cavity with a constantly changing volume, which makes packaging difficult and limits applications in atmospheres with high humidity, corrosive chemicals or gases, and in water or other liquids.

Therefore, there is a need for triboelectric nanogenerators with increased power output.

SUMMARY OF THE INVENTION

The disadvantages of the prior art are overcome by the present invention which, in one aspect, is a triboelectric power system that includes a triboelectric generator, a rechargeable energy storage unit and a power management circuit. The rechargeable energy storage unit is associated to the triboelectric generator. The power management circuit is configured to receive an input current from the triboelectric generator and to deliver an output current corresponding to the input current to the rechargeable battery so that the output current has a current direction and a voltage that will recharge the rechargeable battery.

In another aspect, the invention is a self-powered pressure sensor that includes a substrate and an array of spaced apart triboelectric generators disposed on the substrate. Each triboelectric generator is configured to generate a current when a force is applied and then released from the triboelectric generator. A plurality of sensing circuits is each electrically coupled to a different one of the triboelectric generators. Each of the sensing circuits is configured to generate a voltage when the current from its corresponding triboelectric generator passes therethrough. The voltage is indicative of the force having been applied to the corresponding nanogenerator.

In another aspect, the invention is triboelectric generator that includes a first member and a second member. The first member includes: a first dielectric layer having a top side and an opposite bottom side; a first electrode grid disposed on the top side of the first dielectric layer, the first electrode grid including a first plurality of spaced-apart rows of a conductive material that are electrically coupled to each other; and a second electrode grid disposed on the bottom side of the first dielectric layer, the second electrode grid including a second plurality of spaced-apart rows of a conductive material that are electrically coupled to each other. The second member includes: a second dielectric layer having a top side and an opposite bottom side; a third electrode grid disposed on the bottom side of the second dielectric layer, the third electrode grid including a third plurality of spaced-apart rows of a conductive material that are electrically coupled to each other; and a fourth electrode grid disposed on the bottom side of the second dielectric layer, the fourth electrode grid including a second plurality of spaced-apart rows of a conductive material that are electrically coupled to each other. The second member is disposed under the first member so that the second electrode grid is in contact with the third electrode grid. The first dielectric layer and the second dielectric layer each include a material having a first position on a triboelectric series. The first electrode grid, the second electrode grid and the third electrode grid each include a material having a second position on the triboelectric series that is different from the first position on the triboelectric series, so that when the first member is slid laterally with respect to the second member, a charge imbalance forms between the first electrode layer and the second electrode layer, so that a charge imbalance forms between the fourth electrode layer and the third electrode layer.

In another aspect, the invention is a displacement sensor that includes a top member and a bottom member. The top member includes: a first substrate; a first micrograting base formed from a plurality of spaced-apart rows disposed on the first substrate separated by a corresponding plurality of spaced-apart troughs; a first conductive layer disposed on the first micrograting base and the first substrate; and a first dielectric layer disposed on the first conductive layer, the first dielectric layer having a first position on a triboelectric series. The bottom member includes: a second substrate defining a second micrograting including a plurality of spaced-apart rows separated by a corresponding plurality of spaced-apart troughs; a second conductive layer disposed on the second micrograting; and a second dielectric layer disposed on the second conductive layer, the second dielectric layer having a second position on the triboelectric series that is different from the first position on the triboelectric series. The bottom member is disposed adjacent to the top member so that the first dielectric layer is in contact with the second dielectric layer and so that the rows of the first micrograting run parallel to the rows of the second micrograting so that a charge imbalance occurs between the second conductive layer and the first conductive layer when lateral movement occurs between the first micrograting and the second micrograting in a direction transverse to the rows. The charge imbalance is indicative of an amount of lateral movement.

In another aspect, the invention is a generator for harvesting energy from a shoe having a sole. At least one first triboelectric member is disposed in the sole and includes a first electrode layer and a first material that has a first position on a triboelectric series. At least one second triboelectric member is disposed in the sole. The at least one second triboelectric member includes a second electrode layer and a second material that has a first position on a triboelectric series. The at least one second triboelectric member is disposed so that the first material is opposite the second material. A mechanism is configured to maintain separation between the first triboelectric member and the second triboelectric member when the force is not applied therebetween.

In yet another aspect, the invention is a resonant frequency sensor that includes a first triboelectric generating member. A second triboelectric generating member is spaced apart from the first triboelectric generating member and includes a material that generates a charge imbalance after coming into contact with the first triboelectric generating member and then being separated therefrom. A resonant separating member is configured to maintain the first triboelectric generating member in a spaced apart relationship from the second triboelectric generating member when at rest, but to allow contact therebetween when a force is applied to a selected on of the first triboelectric generating member and the second triboelectric generating member. The resonant separating member has a resonant frequency so that when the force varies according to the resonant frequency, the a first triboelectric generating member and the second a triboelectric generating member will vibrate into and out of contact with each other, thereby generating a current that varies according to the resonant frequency.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 1A-E are a series of schematic views showing operation of a first embodiment of a triboelectric generator.

FIG. 2 is a graph relating charge density to separation distance.

DETAILED DESCRIPTION OF THE INVENTION

Figure 3:
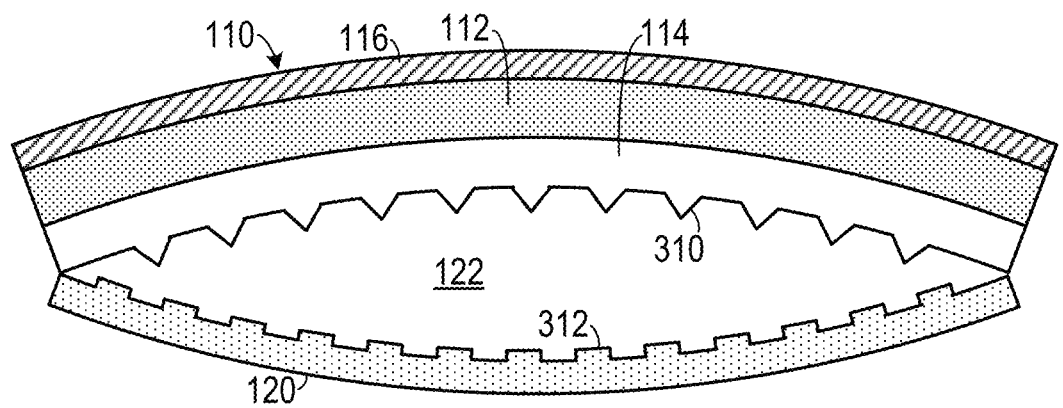
FIG. 3 is a schematic view showing a triboelectric generator with patterned surfaces.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1A, one embodiment of a triboelectric generator 100 includes a first contact charging member 110 that has a first substrate material layer 112, which could include poly(4,4'-oxydiphenylene-pyromellitimide) (which is sold under the trademark "Kapton"), adjacent to a second substrate material layer 113, which can include a material such as SiO$_2$. The first contact charging member 110 also includes a first contact layer 114, which could include, for example, PDMS, PTFE, FEP, PVC, and a Polyimide, or any material that has a triboelectric series rating indicating a propensity to gain electrons due to a contacting event. The first substrate material layer 112 and the second substrate material layer 113 are applied to each other at an elevated temperature and then cooled so that differential shrinkage during cooling causes the contact charging member to have a concave shape. The first substrate material layer 112 can include a polymer sheet having a first thermal expansion coefficient and the second substrate material layer 113 can include a ceramic film having a second thermal expansion coefficient that is less than the first thermal expansion coefficient. A second contact charging member 120 includes an electrically conductive metal layer (which could include a material such as aluminum, a metal or a conductive polymer) that has a triboelectric series rating indicating a propensity to lose electrons when contacted by the first contact layer 114. The second contact charging member 120 defines a concave shape that is reflective of the concave shape of the substrate layer so that when the second contact charging member 120 is placed adjacent to the first contact layer 114, the two layers define a space 122 therebetween unless a force is applied to the layer to bring them together. A first conductive electrode 116, which is applied to the second substrate material layer 113, and the second contact charging member 120, which acts as an electrode as a result of its conductivity, can be coupled to a load 10 to apply current thereto.

As shown in FIGS. 1B-1E, triboelectric nanogenerator 100 generates current by applying a cycled compressive force onto the whole area of the device, so that the bending plates will be periodically pressed to flatten and contact closely with each other, as shown in FIG. 1B. Once released, as shown in FIG. 1C, the two plates will separate apart due to the stored elastic energy and revert instantaneously back to their original arch shape due to resilience. A cycled generation of the potential difference between the two electrodes 112 and 120 drives the flow of electrons through the load 10. At the original state before the contact of the triboelectric films (as shown in FIG. 1A), there is no charge transferred, thus no electric potential. Upon the pressing of the two films towards each other, they will be brought fully into surface contact (as shown in FIG. 1B) and possibly relative sliding would occur, which results in electrons being transferred from a material in the positive side of the triboelectric series to the one in the negative side in the series. Accordingly, electrons will be injected from the aluminum surface 120 to PDMS surface 114, leaving positive charges on aluminum foil 120. The positive triboelectric charges on the conductive aluminum foil 120 attract the electrons in the opposite electrode to flow through the external load 10. After cycles of deformation, when the device is press and the surfaces with charges are in close contact with each other, all of the triboelectric charges will stay on the inner surfaces with the same surface density (CO). Once the pressing force is released, the triboelectric nanogenerator 100 will immediately rebound back to its original arch shape due to the elasticity of the film so that a gap 122 will form again between the two plates, as shown in FIG. 1C. The electric field generated by the separated surface charges will then give rise to a much higher potential on the aluminum foil side 120 than the top electrode 116. Such a potential difference will drive the flow of positive charges from aluminum foil to the top electrode through the external load 10 until the potential difference is fully offset by the transferred charges, rendering the top electrode with a surface charge density of ($\Delta\sigma$), while the aluminum electrode 120 is left with ($\sigma0-\Delta\sigma$), as shown in FIG. 1D. Subsequently, when the triboelectric nanogenerator is pressed again to reach the close contact of the two plates, as shown in FIG. 1E, these redistributed charges will inversely build a positive potential on the top electrode 116, which will drive all of the transferred charges ($\Delta\sigma$) to flow back to the inner surface of the aluminum foil 120. Then a cycle is achieved and the device will go back to the equilibrium state depicted in FIG. 1B.

Both the voltage and current outputs are related to the amount of charges transferred (A$\Delta\sigma$, A is surface area of the plate), which is determined by the triboelectric charge density (σ0) and the separation distance of the two plates. The results of an analytical calculation 200 based on a simplified model of quasi-infinite flat plates, indicates the magnitude of the distance required for the optimum output, as shown in FIG. 2. When the separation distance starts to increase from 0 to 0.7 mm, Δσ keeps a very rapid increase from 0 to ~90% of σ0. Then, the slope of this curve starts to decrease. Thus, both an intimate contact and a subsequent separation of nearly 1 mm result in the phenomenal transferring of charges.

In one experimental embodiment, the electric output measurement was performed on an arch-shaped triboelectric nanogenerator device in a size of 3 cm×2.8 cm, with the triggering frequency of 6 Hz and controlled amplitude. Since the accumulation of the triboelectric charges increases and reaches equilibrium in a certain period of time after multiple cycles, the output will gradually go up in the first stage upon deformation. Then, the open-circuit voltage (VOC) will stabilize at 230 V, measured by an electrometer with infinite input resistance. When the bottom Al is connected to the positive probe of the electrometer, upon the release of the pressing force a positive voltage is generated because of the immediate charge separation. Since the electrons cannot flow in an open-circuit condition, the voltage will hold at a plateau unless there is a quick leakage. The peak value of the short-circuit current (ISC) reaches 94 μA, corresponding to the half cycle of pressing that is in higher straining rate than releasing. The integration of the each current peak gives the total charges transferred in a half cycle of deformation. Moreover, when the connection polarity to the electrometer is switched, both the voltage and current signal will be completely reversed. The gap from the arch-shaped structure is an important factor for the enhanced output, because without the SiO2-film-introduced bending, there will be much smaller and unstable electrical output.

As shown in FIG. 3, the triboelectric effect can be enhanced by using texture patterned surfaces on the first contact layer 114 and the second contact layer 120. For example the surfaces can employ an array of pyramid structures 310 or an array of box-like structures 312, or a combination of these structures or one of many other shaped structures formed in the surfaces.

Fabricating one experimental embodiment began with photolithographic patterning of 4 in. (100) Si wafers with thermally grown $SiO_2$ on top. The patterned wafer with the array of square window openings was firstly etched by buffered-oxide-etching process to transfer the pattern onto the $SiO_2$ layer. Then, the wafer was etched in KOH solution to fabricate the recessed features of pyramid. After cleaned with acetone, isopropanol and ethanol in sequence, the Si molds were treated with trimethylchlorosilane (Sigma Aldrich) by gas phase silanization to enable the easy peel-off of the PDMS film from the Si mold in the following step. In preparing the patterned PDMS film, the elastomer and the cross-linker (Sylgard 184, Dow Corning) were mixed in a 10:1 ratio (w/w), and then casted on the Si mold. After the degassing process under the vacuum, the mixture was spin-coated on the Si mold at 500 rpm for 60 s. After the thermally curing process at 85° C. for 1 hour, the PDMS inked with pyramid patterns was peeled off from Si mold. The surface without patterns were glued to the inner surface of the bending Kapton substrate.

The triboelectric nanogenerator can be integrated with a battery, such as a lithium ion battery. In assembling such an embodiment, two different slurries for the two working electrodes were made, which contain 70 wt % active material ($LiCoO_2$ for cathode and graphite for anode), 10 wt % carbon black powders as conductor, 20 wt % polyvinylidene fluoride (PVDF) binder and N-methyl-2-pyrrolidone (Sigma Aldrich) as the solvent. Then the slurries were cast onto the current collectors (Al foil for cathode and Cu foil for anode) respectively with a uniform thickness of 10 μm. The electrodes were baked at 110° C. under vacuum for 12 hours. Stainless-steel coin cells were used for the battery assembly. The cathode and anode electrodes were stacked with a piece of polyethylene (PE) separator (MTI Corporation) in between. After the system was filled with electrolyte (1M LiPF6 in 1:1:1 ethylene carbonate:dimethyl carbonate:diethyl carbonate, Novolyte Technologies), the coin-cell was finally sealed.

In another embodiment of a triboelectric nanogenerator 400, as shown in FIGS. 4A-4D, the first contact charging member 410 includes a first rigid substrate 412 to which a conductive electrode layer 414 is applied. The first rigid substrate 412 can include a material such as polymethyl methacrylate (PMMA). The conductive electrode layer 414 can include, for example, a material such as gold, a metal, ITO, or a conducting polymer. A first contact layer 416 is applied to the conductive electrode layer 414. The first contact layer 416 is made from a material that has a triboelectric series rating indicating a propensity to gain electrons due to a contacting event, such as, for example, PDMS, PTFE, FEP, PVC, or a polyimide. A second contact charging member 420 includes a second rigid substrate 422, which can include can include a material such as polymethyl methacrylate (PMMA). An electrically conductive material layer 423 is applied to the second rigid substrate 422. Electrically conductive material layer 423 has a triboelectric series rating indicating a propensity to lose electrons when contacted by the first contact layer 416. In one representative embodiment, the electrically conductive material layer 423 includes a gold film 424 and a plurality of gold nanoparticles 426 disposed thereon on. One or more springs 430 maintain a space 432 between the first contact charging member 410 and the second contact charging member 420 except when a force is applied thereto. The springs 430 may be held in place by receptacles 434 defined by the rigid substrates 412 and 422. By selecting the resonant frequency of the springs 430, this embodiment can be used as a resonant frequency sensor.

Figure 4A:
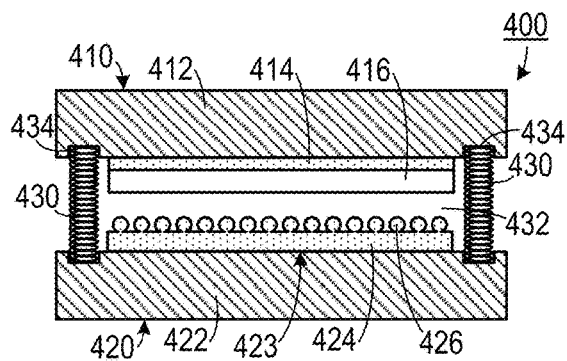
FIG. 4A is a schematic side view of a second embodiment of a triboelectric generator.
Figure 4B:
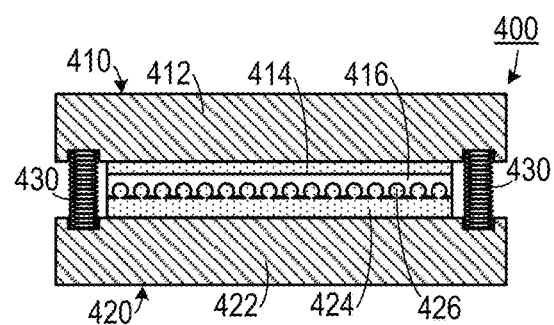
FIG. 4B is a schematic side view of the embodiment shown in FIG. 4A when compressed by an activating force.
Figure 4C:
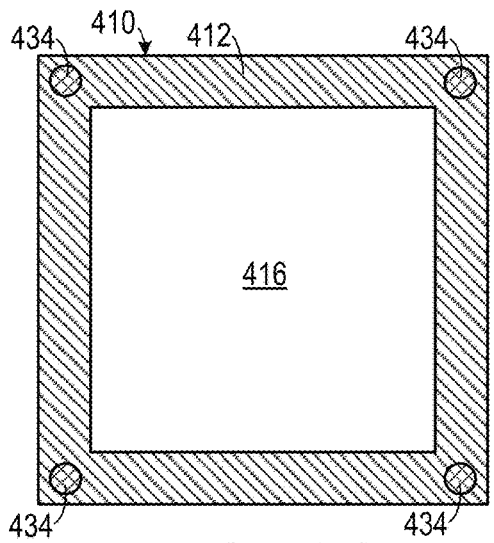
FIG. 4C is a schematic plan view of a first contact charging member employed in the embodiment shown in FIG. 4A.
Figure 4D:
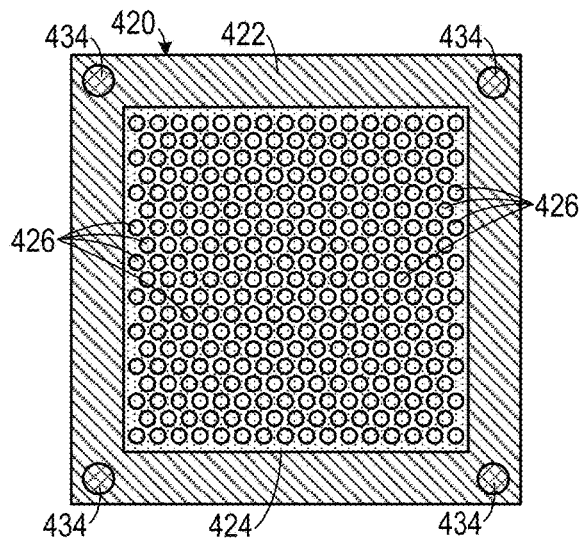
FIG. 4D is a schematic plan view of a second contact charging member employed in the embodiment shown in FIG. 4A.

Compression of the first contact charging member 410 and the second contact charging member 420 is shown in FIG. 4B. The use of nanoparticles 426 increases the contact are substantially, increasing the triboelectric effect. This embodiment of a triboelectric nanogenerator 400 offers a substantially higher power output due nanoparticle 426-based surface modification. In one experimental embodiment, short-circuit current reached a peak value of 2.0 mA, which corresponded to the instantaneous power output of 1.2 W and power density of 322.7 W/m². Average power output and energy conversion efficiency at device level was calculated to be 132 mW and 9.8%, respectively. This embodiment also realized scaling up of nanogenerator power output, making it power not just a single electronic device but hundreds of them simultaneously. Triggered by a commonly available mechanical source such as footfalls, the nanogenerator was capable of instantaneously lighting up 600 commercial LED lamps in real time. This indicates the practicability of harvesting mechanical energy by the nanogenerator on a large scale. The working mechanism demonstrated here can be further applied to potentially harvest large-scale mechanical energy such as from rolling wheels, wind power, and ocean waves.

In one experimental embodiment, the nanogenerator has a layered structure with two substrates. Polymethyl methacrylate (PMMA) was selected as the material for substrates due to its decent strength, light weight, easy processing, and low cost. On the lower side, a layer of contact electrode is prepared. The contact electrode plays dual roles of electrode and contact surface. It consists of a gold thin film and gold nanoparticles coated on the surface. Alternatively, nanoparticles of non-precious metals can also be used as replacements. They modify the surface both physically and chemically. On the other side, a thin film of gold is laminated between the substrate and a layer of polydimethylsiloxan (PDMS). This electrode is referred to as the "back electrode" for later reference. The two substrates are connected by four springs installed at the corners, leaving a narrow spacing between the contact electrode and the PDMS.

The electric energy generation process can be explained by the coupling between triboelectric effect and electrostatic effect. At the original position, a separation distance is maintained by springs. When an external impact is applied onto one of the substrates, the gold and PDMS are brought into contact. According to the triboelectric series that ranks materials' tendency to gain or lose electrons, electrons are injected from gold into PDMS, resulting in surface triboelectric charges, which are retained on the PDMS. As the impact is withdrawn, the contacting surfaces move apart due to restoring force from the springs. Once a separation forms, the back electrode possess a higher electric potential than the contact electrode, producing an electric potential difference. Such a potential difference drives electrons through external loads and screens the positive triboelectric charges on the contact electrode. When the nanogenerator reverts back to the original position, positive triboelectric charges on the contact electrode are completely screened, leaving equal amount of inductive charges on the back electrode. Subsequently, mechanical impact once again shortens the separation, producing an electric potential difference with reversed polarity. In consequence, electrons flow in a reversed direction. They keep screening inductive charges on the back electrode until a direct contact is again established. The insulating PDMS allows long-time retention of the triboelectric charges on its surface even through the triboelectric charges on the metal side are periodically screened by inductive charges. In this process, the nanogenerator acts as an electron pump that drives electrons back and forth between the two electrodes.

The nanogenerator's electric output is strongly related to the contacting force, yielding higher output with larger force. At a force as small as 10 N, the nanogenerator can still produce $I_{sc}$ ranging from 160 µA to 175 µA. When the force increases to 500 N, the electric output reaches a saturated value, producing a peak $I_{sc}$ of 1.2 mA. This result is due to increased contact area with larger force. The two contacting surfaces are neither absolutely flat nor smooth. Surface roughness may be caused by inherent curvature of the substrates, nanoparticle modification, and fabrication defects such as particle contamination from the air. At small contacting force, the surface roughness prevents fully intimate contact between the contact electrode and the PDMS, leaving some areas untouched. With increased force, due to elastic property, the PDMS can deform and fill more vacant space, thus leading to larger contact area. As a result, the electric output increases until all the vacant space is completely filled by the PDMS, reaching a saturated limit.

As an important figure of merit, energy conversion efficiency of the nanogenerator was calculated. The conversion efficiency is defined as the ratio between the electric energy that is delivered to load by the nanogenerator and the mechanical energy the nanogenerator possesses. FIG. 4a is a current pulse output produced by human footfall at load resistance of 1 MΩ. The time span between $t_1$ and $t_2$ represents a single contact. With an external load of pure resistance, the electric energy delivered by the nanogenerator is equal to the Joule heating energy, which is presented below.

$$E_{electric} = Q = \int_{t_1}^{t_2} I^2 \cdot R \cdot dt = R \int_{t_1}^{t_2} I^2 \cdot dt = \\ 1 \times 10^6 (\Omega) \cdot \int_{22.7144}^{22.7200} I^2 \cdot dt = 0.74 \text{ mJ} \quad (1)$$

where Q is the Joule heating energy, I is the instantaneous current, and R is the load resistance. Consequently, the average power output ($W_{average}$) can be obtained by $$W_{average} = \frac{E_{electric}}{t_2 - t_1} = \frac{0.74 \text{ mJ}}{(22.7200 - 22.7144)s} = 132.1 \text{ mW}$$

As soon as the mechanical energy is introduced, it presents in two forms, i.e. elastic energy stored in the springs and kinetic energy carried by a moveable substrate of the nanogenerator. The elastic energy is later released without converting into electric energy, which is calculated by $$E_{elastic} = \frac{1}{2} \cdot k \cdot x^2 \cdot N = 2.56 \text{ mJ} \quad (2)$$

where k is the spring constant (k=1278.88 N/m), x is the displacement of a spring that is equal to the spacing between the two contacting surfaces (x=1 mm), and N is the number of springs (N=4).

For kinetic energy, at the moment when the two substrates make a contact, it completely transforms to other forms, including electric energy and thermal energy. It can be calculated by the following equation.

$$E_{kinetic} = \frac{1}{2} \cdot m \cdot v^2 = 4.97 \text{ mJ} \quad (3)$$

where m is the mass of the moveable substrate (m=13.45 g, the mass of gold thin film and PDMS layer are negligible), and the v is the velocity of the substrate when a contact is just about to be made (v=0.86 m/s).

Therefore, the energy conversion efficiency (η) is calculated as $$\eta = \frac{E_{electric}}{E_{mechanical}} \times 100\% \quad (4)$$
$$= \frac{E_{electric}}{E_{elastic} + E_{kinetic}} \times 100\%$$
$$= \frac{0.74 \text{ mJ}}{2.56 \text{ mJ} + 4.97 \text{ mJ}}$$
$$= 9.8\%$$

It is to be noted that the above result is the overall efficiency at device level. However, at conversion process level, the elastic energy stored in the springs does not participate in energy conversion. Therefore if we solely take into account the kinetic energy that actually partially converts to electric energy, the direct efficiency at conversion process level is $$\eta_{direct} = \frac{E_{electric}}{E_{kinetic}} \times 100\% = \frac{0.74 \text{ mJ}}{4.97 \text{ mJ}} \times 100\% = 14.9\% \quad (5)$$

The unprecedentedly high power output of the nanogenerator is mainly attributed to three factors. Firstly, the contact electrode plays dual roles of electrode and contacting surface. Compared to previously reported designs in which both of the contacting surfaces are made of polymers, more inductive charges will be generated for the new design. Secondly, the elastic property of PDMS enables conformal contact despite of surface roughness. The PDMS can easily deform in response to small pressure and fill the otherwise vacant space that result from substrate curvature and fabrication defects. The tolerance on surface roughness ensures as much contact area as it can be possibly obtained. Also, the surface modification by gold nanoparticles plays an important role for the output enhancement. It can offer five-fold increase on the current output compared to the device without modification. Physically, the bumpy surface of the nanoparticle provides a larger contact area than a flat surface does. Chemically, the as-synthesized gold nanoparticles are positively charged in nature. The pre-carried positive charges may be able to add up with triboelectric charges upon contact, leading to a largely enhanced surface charge density and thus a substantially higher electric output.

In one experimental embodiment, the following fabrication methods were employed.

Materials: Hexadecyltrimethylammonium bromide (≥99%) was purchased from Sigma. Sodium tetrachloroaurate dihydrate (99%) and 1,4-Benzenedithiol (99%) were purchased from Aldrich. Hydrazine hydrate solution (78-82%) was purchased from Sigma-Aldrich. Deionized water was obtained using a Milli-Q ultrapure (18.2 MΩ-cm) system.

Synthesis of gold nanoparticles: A solution (50 mL) containing Sodium tetrachloroaurate dihydrate (1 mM) and hexadecyltrimethylammonium bromide (10 mM) was brought to a vigorous boil with stirring in a round-bottom flask fitted with a reflux condenser; Hydrazine hydrate solution (20 μL) was then added rapidly to the solution. The solution was heated under reflux for another 8 min, during which time its color changed from pale yellow to pale red. The solution was cooled to room temperature while stirring continuously. The average size (56 nm) of the synthesized gold nanoparticles was verified through SEM analysis.

Self-assembly of gold nanoparticles onto Au thin film: Au films were derivatized by immersion in a solution of 1,4-benzenedithiol for 12 h and rinsed with methanol and then water. The derivatized Au films were then immersed in a solution of gold nanoparticles for 12 hours to allow for complete adsorption of a single gold nanoparticle layer. Before the SEM characterization and electrical measurement, non-adsorbed gold nanoparticles were removed by rinsing with water.

Fabrication of the triboelectric nanogenerator: To fabricate the nanogenerator, two pieces of cast acrylic glass were prepared as substrates with dimensions of 3 inch by 3 inch by 3/32 inch. Four half-thorough holes were drilled at corners as houses for spring installation. 50 nm of gold was deposited on both of the substrates by e-beam evaporator (2 inch by 3 inch). On one of the substrates, fluid PDMS that consisted of base and curing agent in a ratio of 5:1 was spin-coated to form a 10 μm-thick layer. Then it was cured at 100° C. for 45 minutes. On the other substrate, gold nanoparticles were uniformly distributed on gold surface by self-assembly. Subsequently, four springs (spring constant=7.3 lb/inch) were installed in the houses to connect the two substrates together, leaving a spacing of 1 mm between the gold and the PDMS. The spacing is required to be substantially larger than the polymer thickness to ensure effective generation of inductive charges. Finally, conducting wires were connected to the two metal layers as leads for subsequent electric measurement or for connection to an external load.

As shown in FIGS. 5A-5D, a basic sliding embodiment of a TENG 500 includes a first member 510 disposed oppositely from a second member 520. The first member 520 includes a first electrode 512 and a first dielectric layer 514 coupled thereto. The second member 520 can serve as both a contact surface and an electrode. In one embodiment, the second member 520 can simply include a layer of aluminum (or other conductive material that is at a different position on a triboelectric series that the first dielectric layer 514), the first dielectric layer 554 can include a PTFE film and the first electrode 512 can include a metal, such as copper. The first electrode 512 may be coupled to the second electrode 520 through a load 530. (While not shown in FIGS. 5A-5D for the sake of simplicity, both the first member 510 and the second member 520 may each be mounted on a suitable substrate, such as an acrylic plate.) The first member and the second member do not have to be planar. They can be curved surfaces as long as they are parallel and have conformal contact with each other.

Figure 5A:
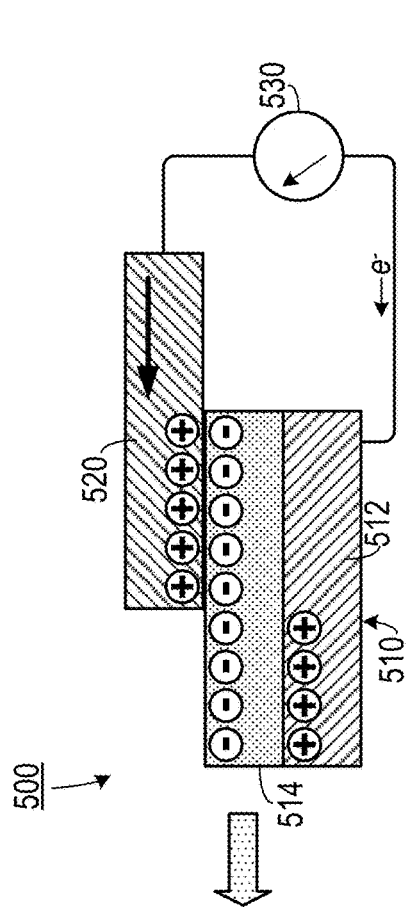
FIGS. 5A-5D are a series of schematic diagrams one embodiment of a triboelectric generator.
Figure 5B:
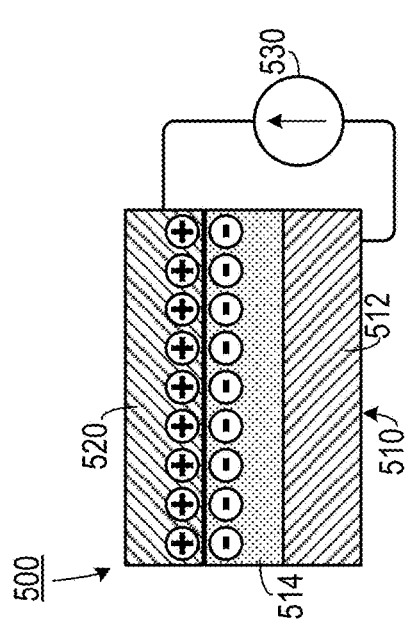
Figure 5C:
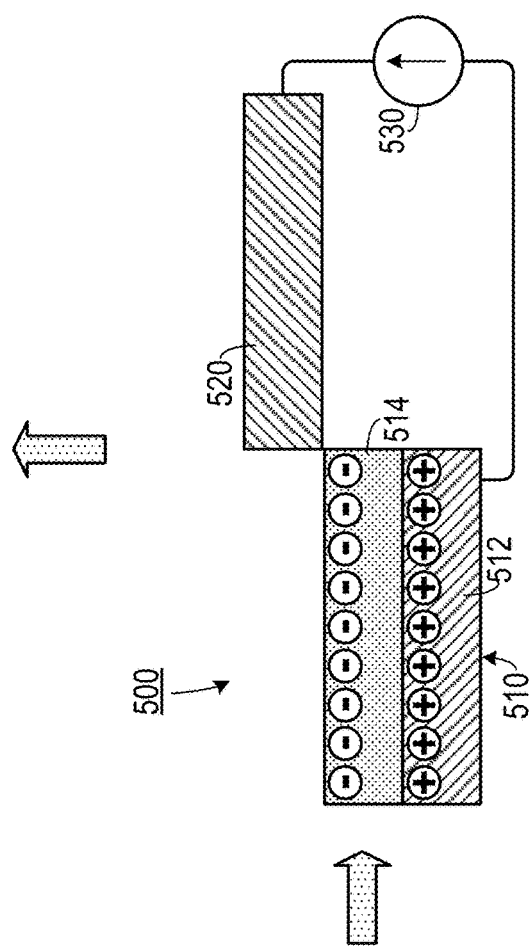

When the first dielectric layer 514 is placed against the second member 520, as shown in FIG. 5A, the triboelectric effect causes electrons to be transferred from the second member 520 to the first dielectric layer 514, thereby causing a net negative charge in the first dielectric layer 514 and a net positive charge in the second member 520. As the first member 510 is in contact with the second member 520 over their entire surfaces, the charges are balanced out. However, when a lateral force is applied to the second member 520 causing it to slide away from the first member 510, as shown in FIG. 5B, then the extra electrons in the first dielectric layer 514 stay in place due to the charge immobility associated with a dielectric while positive charges in the second member 520 move away from the first dielectric layer 514, causing a potential imbalance between the first member 510 and the second member 520. This then causes electrons to flow from the first electrode 512 through the load 530 to the second member 520. When the second member 520 is slid at its maximum offset from the first member 510, as shown in FIG. 5C, all of the negative charges held by the first dielectric layer 514 are balanced with corresponding positive charges in the first electrode 512 while the second member 520 is electrically neutral.

Figure 5D:
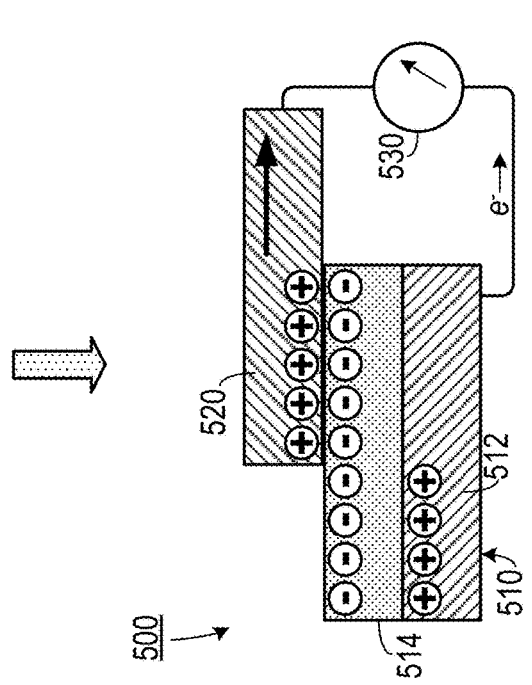
Figure 6A:
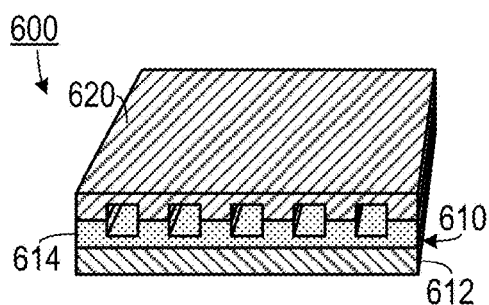
FIG. 6A is a perspective view of an embodiment of a grooved triboelectric generator.
Figure 6B:
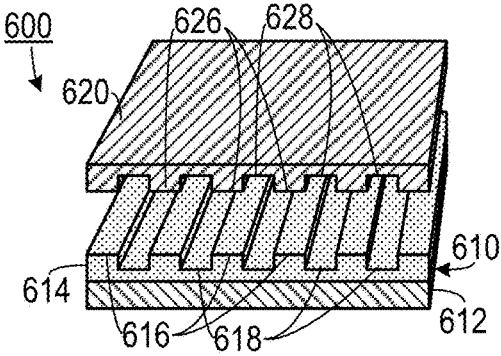
FIG. 6B is a perspective view of an embodiment of a grooved triboelectric generator in which the first member is separated from the second member.
Figure 7A:
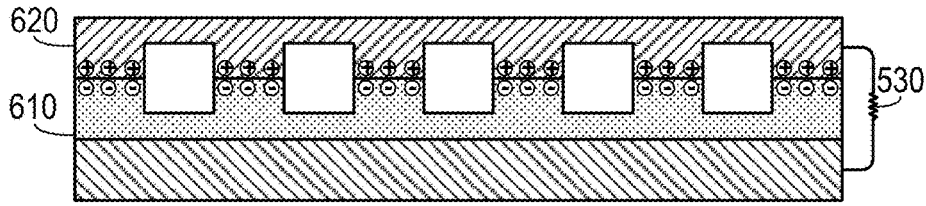
FIGS. 7A-7D are a series of schematic diagrams showing electric generation using the embodiment shown in FIG. 2A.
Figure 7B:
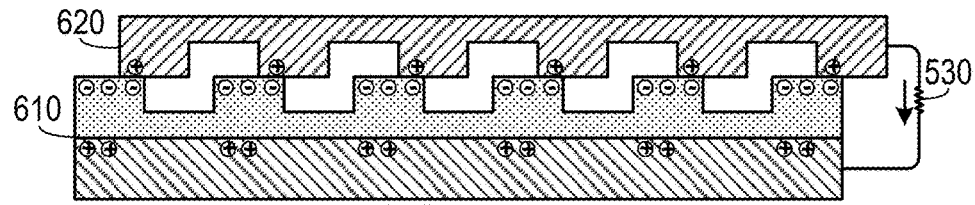
Figure 7C:
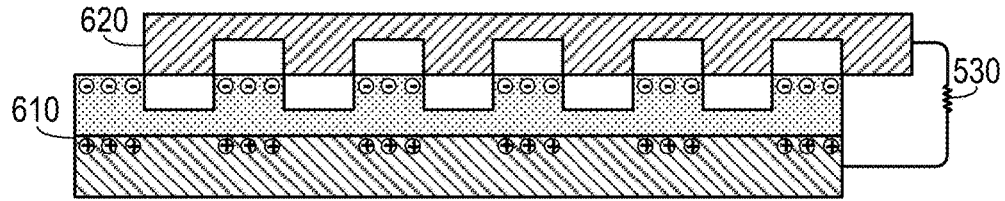
Figure 7D:
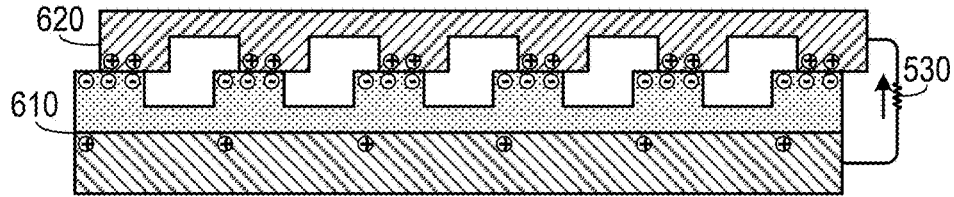

When the second member 520 is slid back over the first member 510, as shown in FIG. 5D, electrons flow back from the first electrode 512 through the load 530 into the second member 520, thereby more closely balancing the charges with the first dielectric layer 514. This causes a current to flow through the load 530 in an opposite direction from the direction it flowed during the motion shown in FIG. 5B. Once the second member 520 returns to the position shown in FIG. 5A, the charges are again balanced between the first dielectric layer 514 and the second member 520. (The same would hold true if the first member 510 is slid over the second member 520, or if both members are in motion so that there is relative sliding motion between the two members.)

The cycle shown in FIGS. 5A-5D can repeat itself, thereby generating an alternating current, if the TENG 500 is adapted with a sliding mechanism to receive force from a reciprocating motion source. The force can be directly applied, or it can be an inertial force due to acceleration. For example, the reciprocating motion source could be the repetitive footfalls of a person walking, or wave motion, or motion coming from a biological system—such as a heartbeat, or gusting wind, or one of many other types of repetitive motion.

One experimental embodiment of a TENG has a structure in which two contacting surfaces that can slide smoothly with one against the other. Acrylic was selected as a substrate material due to its decent strength, light weight and good machinability. On one substrate, aluminum thin film plays dual roles of an electrode and a sliding surface. On the other substrate, copper electrode is sandwiched between the substrate and a PTFE film. The PTFE film acts as another sliding surface. At its original position, the two sliding surfaces are fully aligned, with one sitting freely on the other. Driven by a tangential force applied to a substrate, relative displacement in contact mode occurs in lateral direction. After the two surfaces are fully displaced, the reciprocating force retraces them back to the aligned position.

The principle of the TENG is explained by the coupling between triboelectric effect and electrostatic effect. Once the PTFE film is brought into contact with the aluminum thin film, surface charge transfer takes place due to the triboelectric effect or contact electrification. Since PTFE is much more triboelectrically negative than aluminum, electrons are injected from aluminum into PTFE. At the aligned position, though triboelectric charges present on the surfaces, positive ones on aluminum are fully compensated by the negative ones on PTFE, producing no electric field in the surrounding space if the electric field at the edge is ignored. Once a relative displacement is introduced by an externally applied force in the direction parallel to the surfaces, triboelectric charges are not compensated at the displaced/mismatched areas, resulting in the creation of an effective dipole polarization parallel to the direction of the displacement. Therefore, the uncompensated charges generate electric potential difference (EPD) across the two electrodes. If the electric potential of the copper electrode is set to be zero, the EPD can be analytically expressed as a function of the displacement under simplified approximations.

$$EPD = U_{Al} - U_{Cu} \quad (1)$$

$$= \frac{q}{2\pi\varepsilon_0 WL} \int_0^l \tan^{-1}\left(\frac{l}{t}\right) dt$$

$$= \frac{q}{2\pi\varepsilon_0 WL} \left[\frac{l}{2}\ln(t^2 + l^2) + t\tan^{-1}\left(\frac{l}{t}\right)\right]$$

where l is the mismatched displacement between the two sliding plates, q is the quantity of the triboelectric charges on one plate, $\varepsilon_0$ is the vacuum permittivity, L is the length of the TENG's plate, W is the width of the TENG, and t is the thickness of the PTFE film.

If the two electrodes are electrically connected, once displacement is established, the uncompensated negative triboelectric charges on PTFE will repulsively drive free electrons on the copper electrode to the aluminum electrode, neutralizing the positive triboelectric charges and leaving behind positive induced charges. The flow of induced electrons lasts until the displacement reaches the maximum. Based on assumptions made in the analytical model, the induced charges equal the triboelectric charges in quantity. Therefore, at fully displaced position, the positive triboelectric charges are completely balanced out by induced electrons, indicating no more current flow. As the displacement is diminished by the reciprocating force, the induced electrons flow back to the copper electrode until the fully aligned position is restored. Therefore, in the entire process, alternating current (AC) is produced through the external load.

To characterize the performance of an TENG with a plate size of 6.4 cm by 3.8 cm, the short-circuit current ($I_{sc}$) and open-circuit voltage ($V_{oc}$) were measured at an average sliding velocity of 0.6 m/s introduced by a linear motor. It was found that the $I_{sc}$ exhibits peaks of alternating directions. Increasing displacement gives a positive current peak, while shrinking displacement leads to a negative one. No electric current is produced at either aligned or entirely displaced position. The $V_{oc}$ switches between zero and a maximum value, which corresponds to the aligned and fully displaced positions, respectively. Enabled by a full-wave diode bridge, the AC electric output can be rectified to a DC signal. With a diode bridge, the total accumulative induced charges, independent of sliding direction, can be added up. In this embodiment, every step represents an output current resulting from a one-way sliding motion, generating 0.6 µC of induced charges on average. Correspondingly, the area density of the triboelectric charges is calculated to be 257 µC/m².

In an experimental embodiment of such a dielectric-dielectric system, the sliding-triboelectric nanogenerator includes two plates (71 mm×50 mm) with glass slides as the supporting substrates to ensure the surface flatness. Polyamide 6,6 (Nylon) and polytetrafluoroethylene (PTFE) films, the two polymers at the opposite ends of the triboelectric series, are chosen as the triboelectric layers adhered on surfaces of the glass slides for effective electrification during sliding. On each polymer film, a layer of metal electrode was deposited on the side next to the glass slide (named as top electrode for the one on Nylon and bottom electrode for the one on PTFE). The two plates are kept in parallel to each other and the polymeric surfaces are in intimate contact. As driven by the mechanical motion/vibration along the long-edge of the plate, the two plates slide against each other, with the contact area changing periodically. In order to enhance the triboelectric charge density on the surface, the PTFE film was dry-etched using inductive coupled plasma (ICP) to create aligned nanowire-structures, which increase the surface roughness and the effective surface area. The PTFE surface is uniformly covered with nanowire-structures, with an average length of ~1.5 µm. The PTFE-covered plate was bonded to a stationary stage, while the Nylon side was fastened to a parallel flat-end rail guide, which was connected to a linear motor for inducing an in-plane sliding motion.

In this embodiment, the triboelectrification will leave the Nylon surface with net positive charges and the PTFE with net negative charges with equal density. Since the tribocharges on the insulators will only distribute in the surface layer and will not be leaked out for an extended period of time, the separation between the positively-charged surface and negatively-charged surface is negligible at this overlapping position, and thus there will be little electric potential drop across the two electrodes. Once the top plate with the positively-charged surface starts to slide outward, the in-plane charge separation is initiated due to the decrease in contact surface area. The separated charges will generate an electric field pointing from the right to the left almost parallel to the plates, inducing a higher potential at the top electrode. This potential difference will drive a current flow from the top electrode to the bottom electrode in order to generate an electric potential drop that cancels the tribo-charge-induced potential. Because the vertical distance between the electrode layer and the tribo-charged polymeric surface is negligible compared to the lateral charge separation distance, the amount of the transferred charges on the electrodes approximately equals the amount of the separated charges at any sliding displacement. Thus, the current flow will continue with the continuation of the on-going sliding process that keeps increasing the separated charges, until the top plate fully slides out of the bottom plate and the tribo-charged surfaces are entirely separated.

Subsequently, when the top plate is reverted to slide backwards, the separated charges begin to get in contact again but no annihilation due to the insulator nature of the polymer materials. The redundant transferred charges on the electrodes will flow back through the external load with the increase of the contact area, in order to keep the electrostatic equilibrium. This will contribute to a current flow from the bottom electrode to the top electrode, along with the second half cycle of sliding. Once the two plates reach the overlapping position, the charged surfaces get into fully contact again. There will be no transferred charges left on the electrode, and the device returns to the initial state in. In this entire cycle, the processes of sliding outwards and inwards are symmetric, so a pair of symmetric alternating current peaks should be expected.

The model constructed here has the same structure and dimensions (71 mm×50 mm in surface) with the real device, and those two tribo-charged surfaces are assigned with a charge density of ±70 µf/m², respectively. The device is in open-circuit condition, which means no electron transfer between the two electrodes. When the two plates are in the fully aligned stacking position, there is no potential difference generated. When the top plate slides about half way out (with a displacement of 41 mm), there will be a 2950 V potential difference between the two electrodes; and this potential difference will increase to $1.03 \times 10^5$ V when the top plate just slides out of touching the bottom plate (with a displacement of 71 mm). The voltage keeps increasing when the displacement gets larger, even after the plates slide out of each other. This is because the voltage is the path-integral of the electric field along the displacement. On the other hand, the amounts of transferred charges between the two electrodes under these different displacements are also simulated through equating the potential of the electrodes at the short-circuit condition. The amount of transferred charges increases linearly with the displacement before the top plate slides out of the bottom plate (with the displacement smaller than 71 mm). Different from the trend of the voltage, the amount of transferred charges will saturate at the total amount of tribo-charges on one surface after the plates have fully slid out of each other, because there is no further charge separation here. So, the effective displacement region for generating electricity is between 0 mm and 71 mm, where the contact area of the two plates is changed during the relative sliding of the two plates.

The electrical output of the sliding-TENG was measured, with one plate guided by the linear motor in the direction parallel to the long-edge of the plates. The sliding displacement was 71 mm, which was the same with the length of the plate and thus covered the entire effective region for generating electricity. The sliding movement was in a symmetric acceleration-deceleration mode, with the acceleration rate of ±20 m/s². The open-circuit voltage ($V_{OC}$) was measured by an electrometer with very large input resistance. The electrode at the back of Nylon film was connected to the positive probe. When the plates in the TENG slid from the contact position to the separated position, the $V_{OC}$ jumped from 0 to 1300 V, which reflects the induced potential difference between the two electrodes by the in-plane charge separation. At the separation position, the $V_{OC}$ decayed a little bit, due to the slow charge leakage through the electrometer. When the TENG slid back to the contact position, the $V_{OC}$ jumped back to 0. The density of the transferred charge ($\Delta\sigma$) was also measured at the short-circuit condition. Charges with a density of ~105 µC/m² transferred back and forth between the two electrodes, while the plates slid in and out. Since the plates got fully separated in each cycle, the transferred charge density should approximately equal to the triboelectric charge density on the polymeric surfaces. With these experimental results, the measured $V_{OC}$ is smaller than the simulated potential difference, which is possibly due to the limitation of the electrical measurement system to record such a high voltage and the imperfection from the ideal open-circuit condition. The transfer of the charges between the electrodes in the outer circuits produced an alternating-current output, with the peak short-circuit current density ($J_{SC}$) of 4.1 mA/m² at a maximum sliding velocity of 1.2 m/s. In this experimental embodiment, with such a power output converted from the sliding motion, hundreds of commercial light-emitting diodes (LEDs) were instantaneously driven by a single TENG device.

The TENG's effective output power to the loads depends on the match with the resistance of the load. When the resistance is below ~1 MΩ, the output current density and the voltage have little changes from the short-circuit condition: the current density remains at a value of $J_{SC}$ while the voltage stays close to 0. This is because the TENG has infinitely-large inner resistance. When the resistance goes beyond 1 MΩ, the current density will drop with the increase of the resistance; while the voltage on the load increases. Consequently, the instantaneous power density on the load remains close to 0 with the resistance below 1 MΩ, and reaches the maximum value of 0.42 W/m² at a resistance of ~50 MΩ. This is the maximum output power density on the device.

The output of the planar-sliding-driven TENG is directly determined by the parameters of the sliding motion—the displacement and the velocity, because the flow of electricity originates from the tribo-charge separation under sliding. As simulated, before the two plates fully slide out of each other (with a displacement smaller than 71 mm), the voltage increases monotonically with the displacement. Also, if there is a uniform tribo-charge distribution on the polymeric surface, the total amount of transferred charges will have a linear relationship with the displacement, which can be expressed in charge density as:

$$\frac{\Delta\sigma}{\sigma_0} = \frac{\Delta L}{L_0} \quad (2)$$

where $\Delta\sigma$ is the transferred charge density, $\sigma_0$ is the tribo-charge density on the polymeric surface, $\Delta L$ is the sliding displacement and $L_0$ is the length of the plate which is 71 mm. According to the definition of current density (J), it has the following relationship:

$$J = \frac{d\Delta\sigma}{dt} \quad (3)$$

where t is the time. Merging equation (2) into (3) results in $$J = \frac{\sigma_0}{L_0} \cdot \frac{d\Delta L}{dt} = \frac{\sigma_0}{L_0} v \quad (4)$$

where v is the instantaneous velocity of the sliding. So, the current density should be proportional to the instantaneous velocity at which the two plates are being separated.

A systematic study of these relationships between the electrical outputs ($V_{OC}$ and $J_{SC}$) and the sliding conditions was carried out experimentally. In the first group of experiments, the electrical outputs were measured under a series of 7 different sliding displacements from 11 mm to 71 mm, with an acceleration kept at 20 m/s². It was found that, the $V_{OC}$ increases with the displacement, which is in accordance with simulation results. The measured transferred charge density $\Delta\sigma$ displays a linear relationship with the displacement, which can be linearly fitted with the correlation coefficient of 0.981. As for the peak value of $J_{SC}$ which is in proportional to the maximum velocity $v_m$, it also has a positive correlation with the displacement. This is because $v_m$ has such a relationship with the displacement:

$$v_m = \sqrt{a\Delta L} \quad (5)$$

where a is the acceleration and $\Delta L$ is the total displacement (the displacement for each acceleration and deceleration process is $\Delta L/2$, respectively).

When the sliding displacement remains at a constant value of 71 mm, the maximum velocity of the sliding is solely determined by the acceleration. Thus, the acceleration was varied to investigate the velocity's influence on the output. It was found that $V_{OC}$ has very little increase with the rising acceleration, which is also consistent with the theoretical expectation that $V_{OC}$ is only determined by the displacement. However, the changing rate of the voltage will depend on the sliding velocity. The higher the velocity, the faster the voltage increases/decreases in sliding. As for the output current, the peak value of $J_{SC}$ gets larger at higher acceleration, because of the larger maximum velocity in sliding. However, the sliding velocity has no influence on the transferred charge density $\Delta\sigma$ under the constant displacement.

Because the essence in the working mechanism of the sliding-TENG is the cycled switching between the separation and full contact of the opposite tribo-charges, there should be little electricity generated in the following two cases: (1) If the sliding motion does not result in the change of the contact area between two plates, for example, if a smaller plate slides inside the perimeter of a larger plate at all time, then little output can be measured. This is because there is no polarization generated in this case. (2) If the two plates do not fully in tight contact with each other at the overlapping position, there is always a vertical gap distance between them, which results in two cases: the first is that little triboelectric charges are generated; the second case is that if there are triboelectric charges on the plates, the gap between them in the vertical direction quickly decays the strength of electrostatic interaction, resulting in a reduced output. When the vertical distance between the two plates of the TENG is gradually increased from 0 to 2 mm, the output voltage, current and transferred charges all quickly decay to zero.

The planar sliding mode TENG disclosed herein has several advantages, including: (1) This TENG design does not need a gap between the two plates. Thus it will be unnecessary to have elastic supporting components (such as springs) between the two plates to ensure the effective charge separation. This brings up a lot of convenience in packaging the TENG device; (2) there is no need for a large amount of mechanical energy input to trigger this TENG design, which can help to improve the energy harvesting efficiency. The mechanical energy only needs to overcome the work done by the sliding friction between the two plates. (3) This TENG design is simple in structure, easy in fabrication, compact in volume, stable in performance, cost-effective and robust. With these advantages, such in-plane charge-separation-based TENGs can harvest mechanical energies in the form of relative sliding that are supplied by many different working configurations, for example, the relative rotation of two contacting plates, the vibration of the piston, the rotation of the axis to its tube, and so on. Besides, those types of mechanical energy that can drive the relative sliding between two objects can also be harvested using this principle of in-plane charge-separation-based TENG, which can greatly expand the application of this type of TENG to scavenge mechanical energy from wind power, oceanic wave, human activities, and so on.

As shown in FIGS. 6A, 6B and 7A-7D, the first dielectric layer 614 can include a first grating of evenly spaced apart parallel ridges 616 and troughs 618. Similarly, the second member can include a second grating first grating of evenly spaced apart parallel ridges 626 and troughs 628. As can be seen in FIGS. 7A-7D, while the overall surface contact area density of this embodiment is essentially one half that of the embodiment shown in FIG. 1A-1D, the total sliding distance necessary for maximum charge transfer is limited to the width of a single ridge. Thus, depending on the width of the ridges (which can be microscale using lithographic techniques), this embodiment can generate its maximum current with an extremely small scale source of reciprocal motion (such as vibrations). These embodiments can be made using well known thin film application processes for applying layers to the substrates and standard lithographic techniques for etching the troughs.

Figure 8A:
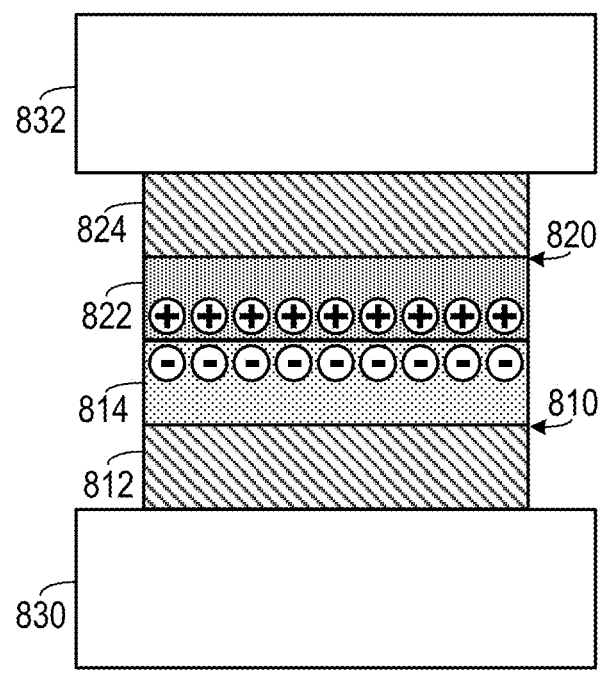
FIGS. 8A and 8B are side elevational view of triboelectric generating devices employing two dielectric layers.
Figure 8B:
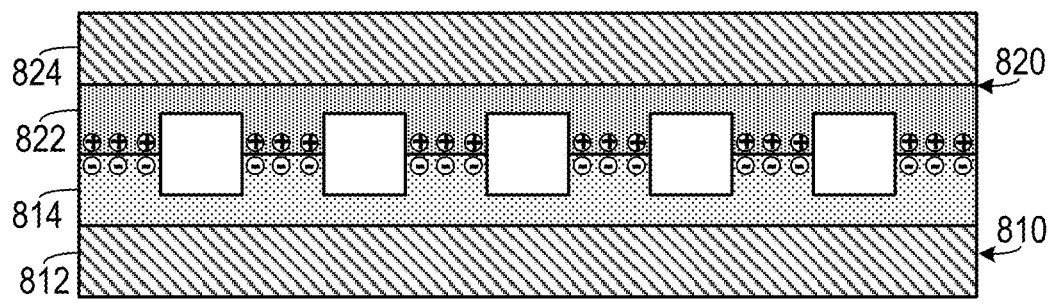

As shown in FIG. 8A, one embodiment includes: a first member 810 having a first electrode 812 mounted on a first rigid substrate 830 and a first dielectric layer 814 applied thereto, and a second member having a second electrode 824 mounted on a second rigid substrate 832 and a second dielectric layer 822 mounted thereto. As shown in FIG. 8B, a two dielectric layer embodiment can also include gratings formed in the first dielectric layer 814 and the second dielectric layer 822.

Introducing linear grating on the sliding surfaces enables the new principle to become an extremely efficient means for energy harvesting; and it is far superior to the previously demonstrated ones in total output charge, current frequency and efficiency. A linear grating with a uniform period is fabricated on both sliding surfaces. The rows of the grating units have the same size as intervals in between, with all rows being electrically connected at both ends by two buses. The grating patterns on both sliding surfaces are identical so that they can match well with each other when aligned. Although the grating design reduces the total contact area by half thus seemingly sacrifices half of the triboelectric charges, it increases the percentage of the mismatched area to 100% for a displacement of only a grating unit length rather than the entire length of the TENG so that it dramatically increases the transport efficiency of the induced charges. Induced free electrons can be pumped back and forth between electrodes for multiple times due to the grating structure, providing multi-folds of output charge compared to a non-grating TENG. Every row of the grating units can be considered as a reduced-sized TENG having a parallel connection with all other rows through buses. In contrast to a non-grating TENG that needs to be fully displaced in order to complete pumping of the induced charges for one time, the grating TENG only requires a displacement of a unit length to completely transport the induced charges, largely improving the energy conversion efficiency. With further displacement of another length of the unit, back flow of the induced charges can be realized. Therefore, for a one-way sliding process across the whole length of the TENG, the induced charges can be pumped for (2N−1) times in total, where N is the number of grating units. If we take into account that the contacting area decreases as the two surfaces slide apart, the following equation represents the total induced charges Q that the grating TENG can provide for a single sliding across the entire length of the TENG:

$$Q = Nq' + |-q' \times (N-1)| + q' \times (N-1) + \ldots + |-q'| + q' \quad (6)$$
$$= Nq' + 2q' \times \sum_{i=1}^{N-1} id$$
$$= (2q'N)N/2d$$

where q' is the induced charges generated from a single grating unit for a displacement of the unit length.

The total maximum induced charges generated by a non-grating TENG can be equivalently expressed as 2q' N. Therefore, Eq. (6) indicates that the total induced charges linearly increase with the grating density. Experimental data from grating TENGs with more units further confirm the validity of the theoretical analysis.

Though the experimental data closely match the theoretical values for N≤4, slight deviation starts to appear if N further increases. The deviation may be attributed to two probable reasons. The first is non-ideal orientation mismatch. The two sliding surfaces are likely to have an angle of mismatch that is introduced by experimental operation. As the length of the grating units shrinks, the angle of mismatch will exert more substantial effect on the effective contact area between the two surfaces, leading to increasingly reduced output charge. This effect can be largely eliminated by more precise alignment during experiment operation. Secondly, assumptions made in the analytical theory may become imprecise for very fine grating units due to the edge effect of each unit. The assumption of infinite charged plane will no longer hold once the grating edges can dominantly affect the electric field distribution, leading to reduced quantity of induced charges. Further systematic investigation by both experiment and simulation is required to quantitatively understand this non-ideal effect. As experimentally observed, $V_{oc}$ is only weakly related to the number of grating units, though slight reduction can be observed. The reduction can also be attributed to the increasingly stronger effect from the mismatched angle. Besides, finer grating units will theoretically give a smaller $V_{oc}$, though this effect may be dominant only when the grating unit has a length approaching the PTFE's thickness. The advantages of the grating structure include not only the enhanced total transported charges but also improved output current. With constant sliding velocity, finer grating shortens the time to transport induced charges between the electrodes for one time, resulting in higher output current. However, the peak of $I_{sc}$ does not increase linearly with the number of units, which may result from non-uniform velocity during sliding process.

To demonstrate the capability of the new principle as a direct power source, a total of 80 commercial LED bulbs were utilized as operating load. They were divided into two groups, which were connected to a TENG with reversed polarity in order to clearly demonstrate the AC output without rectification. One substrate of the TENG was fixed on a breadboard where the LEDs were installed, while the other one was attached to human fingers. As the hand swept back and forth, the sliding was realized. It was noticed that faster sweeping generated higher current peaks as compared with those from slower sweeping. Due to the AC output, the two LED groups were alternately lighted up, as indicated by "ON" and "OFF" states.

Figure 9:
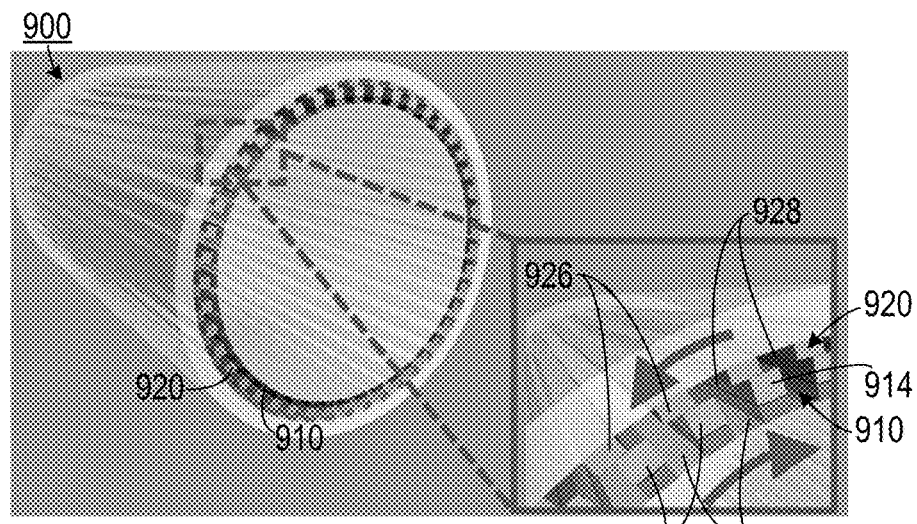
FIG. 9 is a perspective view of a cylindrical embodiment of a grooved triboelectric generator in which the groves run along a cylindrical axis.
Figure 10:
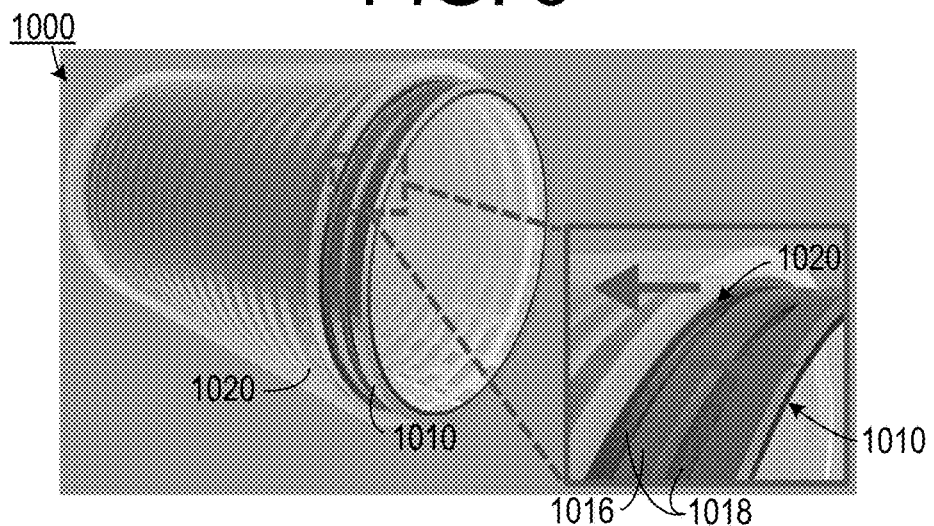
FIG. 10 is a perspective view of a cylindrical embodiment of a grooved triboelectric generator in which the groves run transverse to a cylindrical axis.
Figure 11:
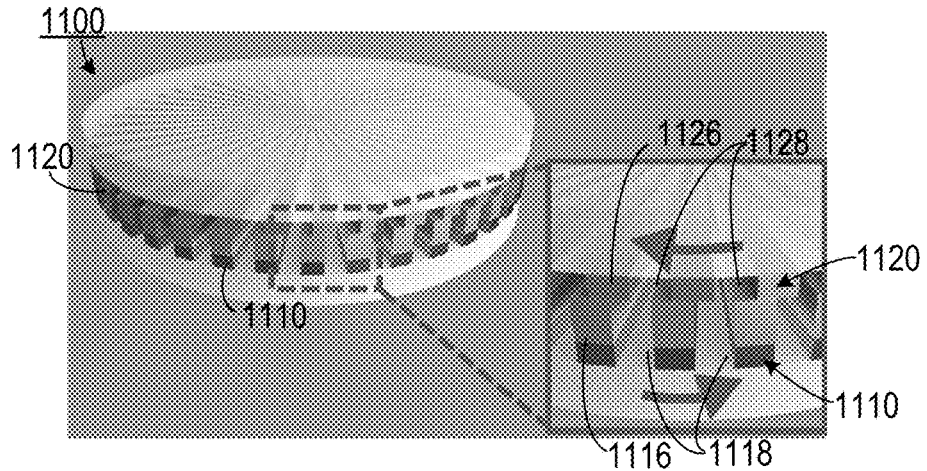
FIG. 11 is a perspective view of a disc-shaped embodiment of a grooved triboelectric generator in which the groves extend radially from a central axis.

Besides the planar design, other configurations include, concentric discs having relative rotation and coaxial tubes having either rotational motion or reciprocating piston motion. The principles demonstrated for the grating TENG can be applied to other configurations. For example, as shown in FIG. 9, in one embodiment of a TENG 900 the first member 910 and the second member 920 are cylindrical. The first dielectric layer 914 includes a first grating of evenly spaced apart parallel ridges 916 and troughs 918 and the second member 920 includes a second grating of parallel ridges 926 and troughs 928. All of the ridges and troughs extend parallel to the axis of the cylinder. Thus, when either the first member 910 or the second member 920 is rotated about the cylindrical axis (or both rotated so long as there is relative motion between them), the ridges of the second member 920 and the first member 910 will come in and out of contact. This embodiment is effective when it is desired to turn rotational motion into electricity. In the embodiment shown in FIG. 10, the ridges 1016 and troughs 1018 of the first grating and the second grating are disposed circumferentially about the cylinder and the sliding mechanism is configured to apply reciprocating motion along the cylindrical axis to either the first member 1010 or the second member 1020 (or both so long as there is relative motion between them), thereby converting the reciprocating motion into electricity. In the embodiment shown in FIG. 11, the ridges 1116 and troughs 1118 of the first grating and the second grating extend radially outwardly from a central axis of a disk. Electricity is generated when at least one of the first member 1110 and the second member 1120 is caused to rotate around the central axis of the disks (or both can be rotating so long as there is relative rotational motion between them).

Figure 12:
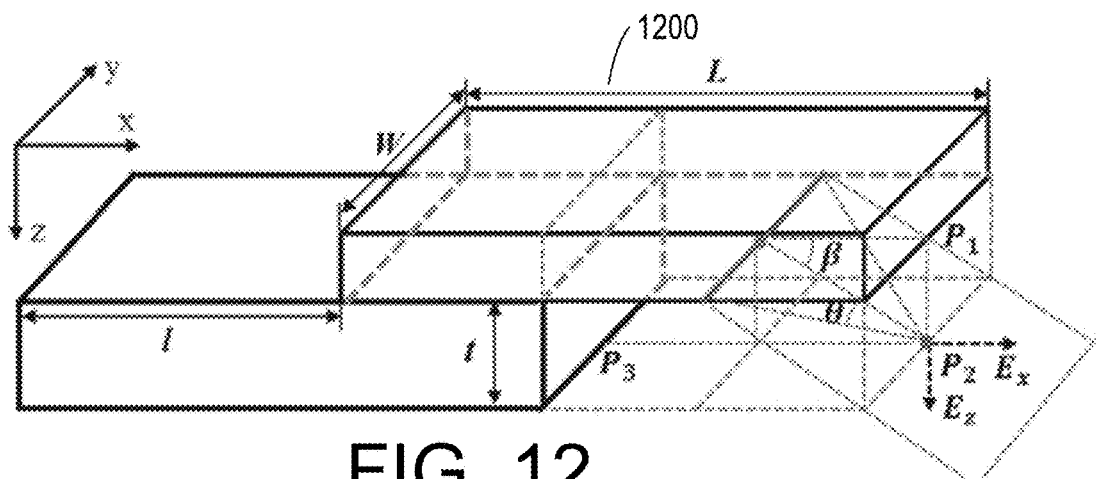
FIG. 12 is a schematic diagram showing dimensions of a triboelectric generator used in analysis thereof.

An analytical model for calculating the open-circuit voltage of a TENG 1200 is now presented using the diagram shown in FIG. 12. For simplicity of the mathematical derivation, the analytical model is built based on the following assumptions:

(1) The two sliding surfaces of the TENG are infinitely large because the lateral dimension is much larger than the vertical thickness.

(2) The generated triboelectric charges, which are non-mobile and non-annihilative, are uniformly distributed on the two surfaces. This is an excellent approximation if the two materials are insulative. In a case that one side is metal, this approximation is made for easy derivation.

(3) Both the aluminum and the PTFE thin film can be simplified as planar surfaces which retain their shapes instead of having deformation when sliding laterally. Once the two surfaces contact with each other, triboelectric charges are created due to contact electrification. Based on assumption (2) and assumption (3), the lateral displacement/brings about uncompensated positive and negative triboelectric charges in the displaced areas on the upper surface and the lower surface, respectively.

If we define the electric potential of the copper electrode ($U_{Cu}$) to be zero, the open circuit voltage of the TENG is equal to the electric potential of the electrode electrode ($U_{Al}$), that is, $$V_{oc} = U_{Al} - U_{Cu} = U_{Al} = U_{P_1} - U_{P_3} \tag{S1}$$

Also, the electric potential difference can be expressed as $$U_{P_1} - U_{P_3} = \int_{P_1}^{P_3} E \cdot dl_{1 \to 3} = \int_{P_1}^{P_2} E_{1 \to 2} \cdot dt + \int_{P_2}^{P_3} E_{2 \to 3} \cdot dl \tag{S2}$$

Meanwhile, given assumption (1) and (2), we can consider the upper surface as charged plate of infinity in size, so that the electric lines of force are perpendicular to the surface of the plate as well as the patch from $P_2$ to $P_3$. As a result $$\int_{P_2}^{P_3} E_{2 \to 3} \cdot dl = 0 \tag{S3}$$

and $$U_{Al} = \int_{P_1}^{P_2} E_{1 \to 2} \cdot dt \tag{S4}$$

In order to calculate the electric field strength $E_{1 \to 2}$ in the path from $P_1$ to $P_2$, let us consider an infinite, charged line in the displaced area on the upper surface. And the corresponding electric field strength $E_{sl}$ at $P_2$ can be quantitatively expressed as $$E_{sl} = \int_{-\theta}^{+\theta} \frac{\sigma}{4\pi\varepsilon_0} \cdot \frac{\cos\theta}{\sqrt{t^2 + l^2}} \cdot d\theta = \frac{\sigma}{2\pi\varepsilon_0} \cdot \frac{\sin\theta}{\sqrt{t^2 + l^2}} \tag{S5}$$

where $\varepsilon_0$, is the permittivity of vacuum, t is the thickness of the PTFE film, l is the displacement, and σ is the line charge density $$\sigma = \frac{q}{WL} \tag{S6}$$

where q is the total triboelectric charges, W and L are the width and length of the two sliding surfaces, respectively. Meanwhile, in our case, compared with the PTFE's thickness, the charged line is considered to be infinitely long, thus, $$\theta = 90° \tag{S7}$$

Upon combination and simplification, $E_{sl}$ can be expressed as $$E_{sl} = \frac{q}{2\pi\varepsilon_0 WL\sqrt{t^2 + l^2}} \tag{S8}$$

However, only the component along Z axis of the electric filed strength $E_{sl}$ is parallel to the electric field, making the effective electric filed strength expressed as $$E_{eff} = E_{sl} \cdot \sin\beta \tag{S9}$$

$$\sin\beta = \frac{t}{\sqrt{t^2 + l^2}} \tag{S10}$$

Upon combination and simplification, $$E_{eff} = E_{sl} \cdot \sin\beta = \frac{q}{2\pi\varepsilon_0 WL} \cdot \frac{t}{(t^2 + l^2)} \tag{S11}$$

Thus, the total electric filed strength $E_{1 \to 2}$ generated at $P_2$ along the z-axis by the triboelectric charges on the entire displaced area of the upper surface can be calculated as $$E_{1 \to 2} = \int_0^l \frac{q}{2\pi\varepsilon_0 WL} \cdot \frac{t}{(t^2 + l^2)} dl = \frac{q}{2\pi\varepsilon_0 WL} \cdot \tan^{-1}\left(\frac{l}{t}\right) \tag{S12}$$

Submit the Equation (S12) into the Equation (S4)

$$U_{Al} = \int_0^t E_{1 \to 2} \cdot dt = \int_0^t \frac{q}{2\pi\varepsilon_0 WL} \cdot \tan^{-1}\left(\frac{l}{t}\right) dt \tag{S13}$$

Finally, the open-circuit voltage $V_{oc}$ between the two electrodes can be expressed as $$V_{oc} = U_{Al} = \frac{q}{2\pi\varepsilon_0 WL} \cdot \left[\frac{l}{2}\ln(t^2 + l^2) + t\tan^{-1}\left(\frac{l}{t}\right)\right] \tag{S14}$$

The energy conversion efficiency (η%) can be estimated through the conversation of energy. According to the definition:

$$\eta\% \equiv \frac{E_{ele}}{E_{Mech}} \times 100\%$$

where $E_{ele}$ is the electrical energy generated in the half cycle of the displacement, and $E_{Mech}$ is the mechanical energy input. They can be estimated as follow.

The maximum electrical energy generated by the sliding TENG in a half-cycle, be estimated using the data of the TENG's output characteristic when driving external load. The highest power output is reached at the resistance of 80 MΩ, which will correspond to the maximum electric energy output ($E_{ele}$). It can be calculated according to the following equation:

$$E_{ele} = \int I^2 R dt$$

The curve of $I^2R$ vs. t (R=80 MΩ) can be derived from the corresponding I vs. t curve, and through the integration of one ($I^2R$) peak in a half-cycle, we can get:

$$E_{ele} = 0.145 \text{ mJ}.$$

In general, the mechanical energy input for driving the sliding TENG is converted into two parts: the electrostatic energy ($E_{es}$) of the two oppositely-charged plates at the fully displaced position, and the electrical energy ($E_{ele}$) the TENG generated in the sliding process.

As for the electrostatic energy $E_{es}$, it can be estimated as:

$$E_{es} = U_T \sigma_0 A + U_B(-\sigma_0)A = (U_T - U_B)\sigma_0 A = V_{OC}\sigma_0 A$$

where $U_T$ and $U_B$ are the potentials at the top plate and bottom plate, respectively; and A is the area of the plate, which is 35.5 cm². In this estimation, we assume each charged plane has a uniform potential, which is reasonable as shown in the simulated results of the potential distribution. From the electrical measurement of the TENG, $V_{OC}$ is ~1300 V and $\sigma_0$ is ~105 μC/m². Thus, we can get $$E_{es}=V_{oc}\sigma_0 A=1300\ V\times 105\times 10^{-6}\times 35.5\times 10^{-4}\ C=0.485\ mJ$$

Thus, the mechanical energy input $E_{Mech}$ can be estimated to be:

$$E_{Mech}=E_{es}+E_{ele}=0.630\ mJ$$

The other part of energy input is the heat dissipated during mechanical sliding, which is rather difficulty to estimate for the current design. If we ignore this component, the maximum energy conversion efficiency can be estimated as follows:

$$(\eta\ \%)\max \equiv \frac{E_{ele}}{E_{Mech}}\times 100\% = \frac{0.145\ mJ}{0.630\ mJ}\times 100\% = 23.0\%$$

Figure 13:
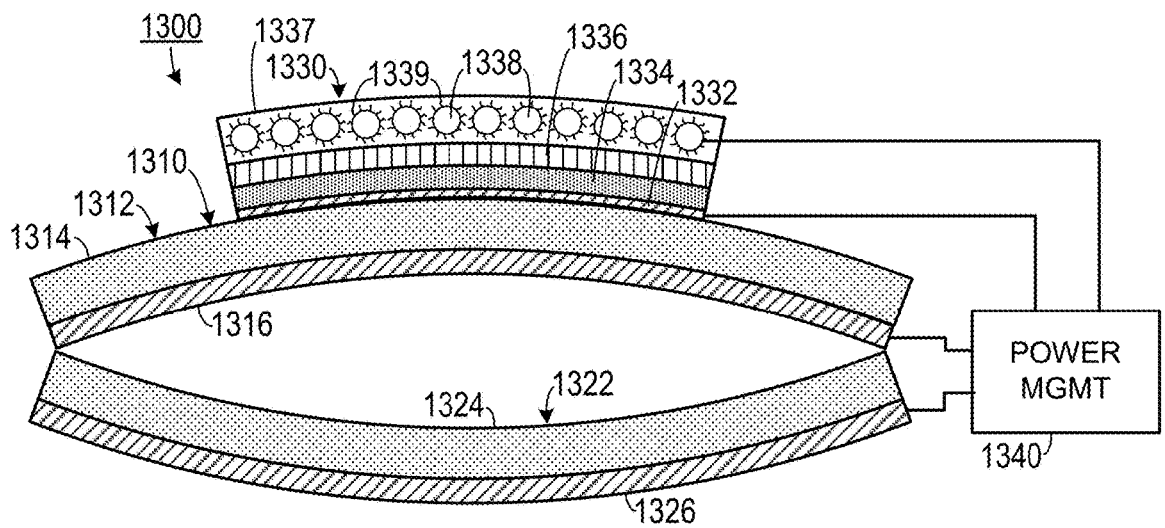
FIG. 13 is a schematic diagram (elevational view) of a first embodiment triboelectric generator with an integrated energy storage system.

While many different materials can be organized according to a triboelectric series, the following is one representative example of a triboelectric series:
Asbestos
Glass
Mica
Nylon
Lead
Silk
Aluminum
Steel
Wood
Lucite
Amber
Hard Rubber
Mylar
Nickel
Copper
Silver
Brass
Synthetic Rubber
Gold, Platinum
Sulfur
Acetate, Rayon
Polyester
Celluloid
Polystyrene
Orlon, Acrylic
Polyvinylidene chloride (Saran)
Polyurethane
Polyethylene
Polypropylene
Polyvinylchloride (Vinyl)
PTFE
Silicon
Teflon
Silicone Rubber As shown in FIG. 13, one embodiment of a triboelectric power system 1300 includes a triboelectric generator 1310, an integrated rechargeable energy storage unit 1330 and a power management circuit 1340 that delivers current from the triboelectric generator 1310 to the energy storage unit 1330 with the proper characteristics (e.g., current direction, voltage, etc.). In this embodiment, the triboelectric generator 1310 includes a first triboelectric member 1312 and an oppositely disposed second triboelectric member 1322. The first triboelectric member 1312 includes a first dielectric layer 1314 (which can include, for example, a Kapton film). In one embodiment, the first dielectric layer 1314 is subjected to a thermal stress environment that causes it to maintain a concave shape while at rest. A first conductive electrode layer 1316 is affixed to the first dielectric layer 1314. The first electrode layer 1316 is made from a material having a first position on a triboelectric series. The second triboelectric member 1322 includes a second dielectric layer 1324 (which could also include a Kapton film) having a second position on the triboelectric series that is different from the first position. The second dielectric layer 1324 is also subjected to a thermal stress environment that causes it to maintain a concave shape while at rest. The two opposing concave shapes of the first member 1310 and the second member 1322 act as an at-rest separating mechanism. A second conductive electrode layer 1326 is affixed to the second dielectric layer on a side opposite from the first conductive electrode layer 1316. This embodiment operates in a manner similar to the embodiment shown in FIGS. 1A-1D. A nano-scale texture applied a selected on of the first conductive electrode layer 1316 and the second dielectric layer 1324 to improve triboelectric charge exchange efficiency.

The rechargeable energy storage unit 1330 can be a rechargeable battery, a capacitor, a super capacitor, and even combinations of these items. In one embodiment, the rechargeable energy storage unit 1330 comprises a lithium ion battery. In one embodiment, the lithium ion battery can include an aluminum electrode layer 1332, an LiFePO4 layer 1334 disposed on the aluminum electrode layer 1332, a separator layer 1336, a carbon fiber cloth layer 1337 that includes a plurality of carbon fibers 1338 and a plurality of TiO2 nanowires 1339 extending from the carbon fibers 1338.

The power management circuit 1340 insures that the current supplied to the energy storage unit 1330 is delivered in the proper format. It could be a simple rectifier (such as a diode bridge rectifier), an integrated power control circuit, a transformer, and even combinations of these devices.

Flexible self-charging power units (SCPU) of this type are capable of simultaneously harvesting and storing ambient mechanical energy, by integrating a triboelectric nano-generator (TENG)-based mechanical energy harvester and a Li-ion battery (LIB) based energy storage. In this SCPU, the Li-ion battery portion can be directly charged by mechanical motion. The integration is realized through developing a flexible LIB on an arch-shaped TENG structure. When the surrounding mechanical energy is applied onto the SCPU, an alternating-current in response to the external triggering is generated. After rectification, the electrical energy is stored in the LIB. With this SCPU, environmental mechanical energy can be scavenged to charge the battery while the battery keeps driving an external load as a DC source. In this embodiment, the SCPU can provide a continuous and sustainable DC current of 2 μA at a stable voltage of 1.55 V for as long as there is mechanical motion or agitation. The LIB in the SCPU serves not only as energy storage, but also as a power regulator and management for the entire system by utilizing the stable electrode-potential difference. Since mechanical motion is available almost everywhere and at any time to replenish the energy draining in the battery, a large-capacity battery with a high density may not be necessary to ensure a long operating lifetime. This could introduce a new alternative to the need for high density batteries in many applications.

In one experimental embodiment, the integration of a LIB and a TENG in the SCPU was achieved through the construction of a flexible LIB, which was made in an arch shape for creating the gap necessary for the TENG structure. In order to make the battery flexible, a polymeric shell was used for packaging and sealing, so as to replace the conventional ridge coin cell. The supporting substrate of this polymeric shell was a bent Kapton film (3 cm×4 cm) with purposely-introduced thermal stress through the deposition of a $SiO_2$ film at high temperature. Three kernel components of the LIB included: the $TiO_2$ nanowires (NWs) anode, the polyethylene (PE) separator and the $LiFePO_4$/active carbon/binder mixture cathode on the Al current collector, were laminated on top of the convex surface (the surface deposited with $SiO_2$) of this Kapton substrate. This kernel structure with an effective area of ~1.5 cm×1.5 cm was immersed in the electrolyte. In order to enhance the flexibility of the battery from the anode side, the $TiO_2$ NWs with an anatase crystal structure was hydrothermally grown on a piece of soft carbon cloth that also serves as the current collector. This anode layer exhibited excellent flexibility. The battery was isolated from air by covering is with a layer of thin Kapton film and sealing is with polydimethylsiloxane (PDMS) and epoxy at the sides. For the hybridization with the TENG, this LIB's supporting Kapton substrate was deposited with Al film on the back and bonded with another bent Kapton film of the same size in a face-to-face manner. This formed an arch-shaped TENG structure based on the triboelectrification between the top Al layer and the bottom Kapton that has the corresponding electrode (Al film) deposited on its convex surface. In order to enhance the triboelectric charge density through large surface roughness and increased effective contact area, the concave surface of the bottom Kapton was pretreated with inductive coupling plasma (ICP) reactive ion etching, to produce a nanorod-covered surface nanoscale texture.

With this hybridized SCPU structure, the LIB can be charged through harnessing ambient mechanical energy, by rectifying the TENG-generated alternating-current (AC) pulses to DC with a full-wave bridge rectifier. When external mechanical vibration is applied onto the flexible SCPU to periodically flatten it, the two surfaces across the gap will get into contact from time to time. Coupling of the triboelectric effect with the electrostatic induction will generate a flow of current in the external circuit, which will be stored in the LIB in the same device. In its starting state before any mechanical deformations induce contact between the two surfaces, there are no triboelectric charges (tribo-charges) and thus no current generation. When ambient mechanical vibration applies a pressing force onto the SCPU, the structure will be flattened, so that the top Al and bottom Kapton across the gap will be brought into contact. Due to the triboelectric effect, electrons will transfer from the Al to the Kapton because of the difference in electron attractions. This produces positive tribo-charges on the Al surface while the Kapton surface will develop negative charges of the same density. At this moment, there is no induced electrical potential to drive the flow of current, thus the LIB is not being charged.

However, once the pressing force is withdrawn, the SCPU will start to return to its original arch shape, thereby separating the opposite tribo-charges. This will induce a higher potential in the top Al layer, which will drive the flow of current from the top Al to the bottom electrode, and through the LIB from its positive electrode to its negative electrode as a result of the full-bridge rectification. The charging reactions at the two electrodes are enabled by this current, which stores the generated electrical energy. This will last until the SCPU fully returns to its original shape and the accumulation of the transferred charges completely screens the tribo-charge-induced potential. In the ideal case, the amount of charges stored in the LIB during this half cycle equals the number of tribo-charges on the Kapton surface.

Subsequently, once the SCPU is pressed again, the distance between the opposite tribo-charges will be reduced, so that the induced potential difference between the two electrodes will begin to diminish. The transferred charges will flow back to re-establish equilibrium, which will contribute to a second current peak through the rectifier in the reverse direction. Because of the rectifier, the current through the LIB will still be in the charging direction so that the electrical energy in this second half cycle will be stored. When the SCPU is subjected to a lasting mechanical agitation, this cycle will keep taking place so that more and more energy will be stored in the LIB part of the SCPU.

Figure 14:
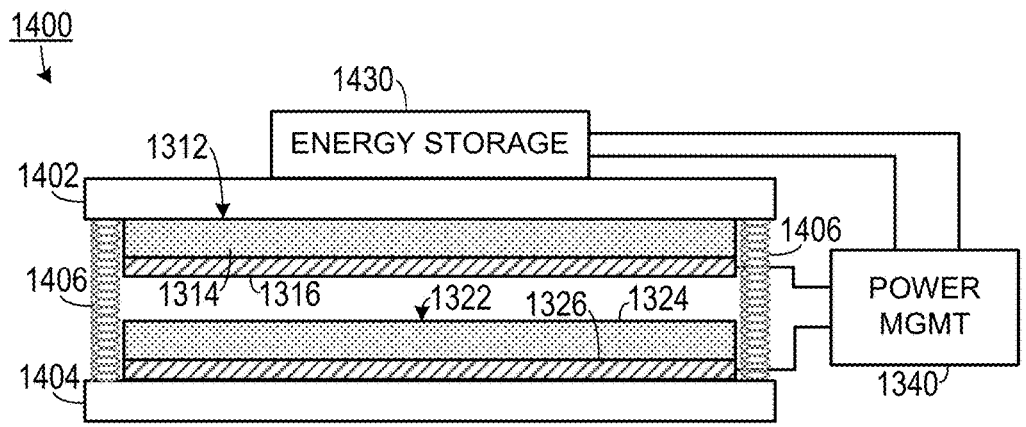
FIG. 14 is a schematic diagram (elevational view) of a second embodiment of a triboelectric generator with an integrated energy storage system.

As shown in FIG. 14, a second embodiment of a triboelectric power system 1400 can include a first rigid substrate 1402 on which the first member 1312 is disposed and a second rigid substrate which the second member 1322 is disposed. At least one spring 1406 can be employed to maintain at-rest separation between members 1312 and 1322.

Figure 15A:
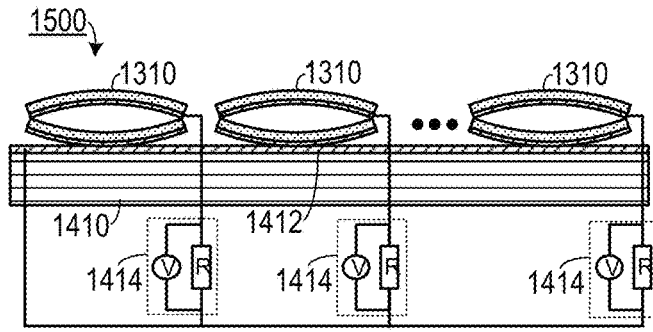
FIG. 15A is a schematic diagram (elevational view) of a self-powered triboelectric pressure sensing system.
Figure 15B:
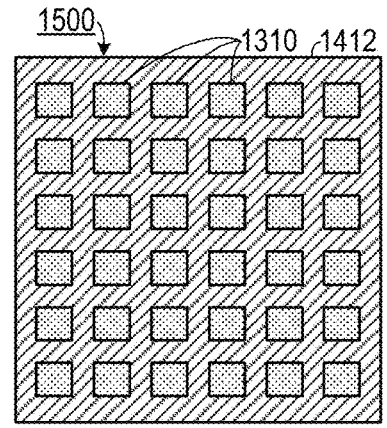
FIG. 15B is a schematic diagram showing a plan view of the embodiment shown in FIG. 15A.

As shown in FIGS. 15A-15B, one embodiment of a self-powered pressure sensor 1500 can include a substrate 1410 upon which an array of spaced apart triboelectric generators 1310 is disposed. A plurality of sensing circuits 1414 (which could include a simple resistor and a circuit that detects the voltage drop across the resistor) are each electrically coupled to a different one of the triboelectric generators 1310. Voltage sensed by each of the sensing circuits 1414 indicates force that has been applied to its corresponding nanogenerator 1310. A conductive layer 1412 can be applied to the surface of the substrate 1410 and electrically coupled to the second conductive electrode layer of each triboelectric generator 1310 so as to act as a common ground.

As shown in FIG. 16A-16D, a flexible thin embodiment of a sliding triboelectric generator 1600 includes a first member 1610 and a second member 1620. The first member 1610 includes a flexible first dielectric layer 1612 (which could include, for example, PTFE), a first electrode grid 1613 is disposed on the top side of the first dielectric layer 1610. The first electrode grid 1613 includes a first plurality of spaced-apart rows 1614 of a conductive material (such a metal) that are electrically coupled to each other by a transverse row 1616. A second electrode grid 1615 is disposed on the bottom side of the first dielectric layer 1610. The second electrode grid 1615 includes a second plurality of spaced-apart rows 1616 the conductive material that are electrically coupled to each other. The first grid 1613 and the second grid 1615 can be thin films deposited on the surfaces of the first dielectric layer 1612 or embedded therein.

The second member 1620 includes a second dielectric layer 1622 with a third electrode grid 1623 disposed on the bottom side and a fourth electrode grid 1625 disposed on the bottom side. The second member 1620 is disposed under the first member 1610 so that the second electrode grid 1615 is in contact with (and electrically coupled to) the third electrode grid 1623. The first dielectric layer 1612 and the second dielectric layer 1622 each include a material having a first position on a triboelectric series; the second electrode grid 1615 and the third electrode grid 1623 each include a material having a second position on the triboelectric series that is different from the first position on the triboelectric series. When the first member 1610 is slid laterally with respect to the second member 1620, a charge imbalance forms between the first electrode layer 1613 and the second electrode layer 1615 also, a charge imbalance forms between the fourth electrode layer 1625 and the third electrode layer 1623. When a first load (not shown) is coupled between the first electrode layer 1613 and the second electrode layer 1615 and, similarly, when a second load (not shown) is coupled between the third electrode layer 1623 and the fourth electrode layer 1625, currents will flow through the loads. The process by which this occurs is similar to the process of current flow associated with the embodiments shown in FIGS. 5A-5D.

Figure 16A:
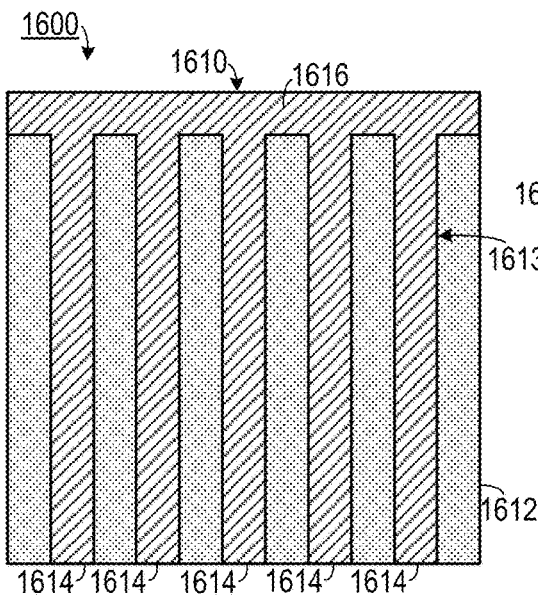
FIG. 16A is a schematic diagram (plan view) of one member of a triboelectric generator.
Figure 16B:
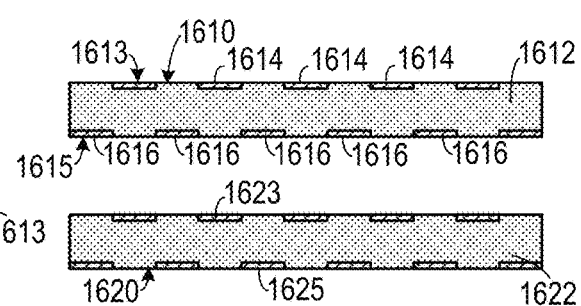
FIG. 16B is a schematic diagram (separated elevational view) of a triboelectric generator employing the member shown in FIG. 16A.
Figure 16C:
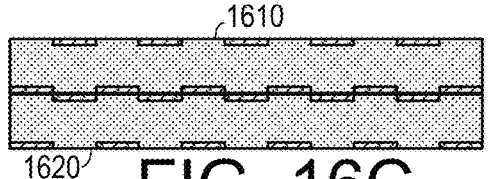
FIG. 16C is a schematic diagram (elevational view) of the triboelectric generator shown in FIG. 16B in which the members are together in normal operating mode.
Figure 16D:
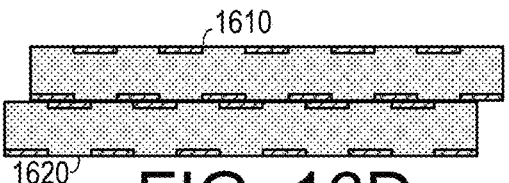
FIG. 16D is a schematic diagram (elevational view) of the triboelectric generator shown in FIG. 16B showing relative movement between the members.
Figure 16E:
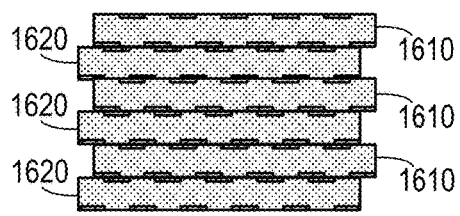
FIG. 16E is a schematic diagram (elevational view) of the triboelectric generator shown in FIG. 16B showing stacking of several members.

A nanoscale texture can be applied at least a selected one of the first dielectric layer 1612, the second dielectric layer 1622, the second electrode grid 1615 and the third electrode grid 1623 to improve triboelectric charge transfer efficiency. The nanoscale texture can be formed by applying PTFE nanoparticles the first dielectric layer 1612 and to the second dielectric layer 1622. As shown in FIG. 16E, this embodiment can be stacked in many layers to achieve enhanced electrical effects.

In one experimental embodiment, a micro-grabbing triboelectric generator (MG-TENG) of the type disclosed with respect to FIGS. 16A-16E, includes polytetrafluoroethylene (PTFE) thin films with a pair of metal gratings on opposite sides. The grating is a collection of metal strips separated by equal-sized intervals. All of the strips of each grating are electrically connected by a bus at one end. The paired gratings are identical but complementary with relative displacement of half pitch. On the top surface, a layer of PTFE nanoparticles is applied as surface modification to enhance charge transfer. The thin films in this experimental embodiment have a total area of 60 $cm^2$, a total volume of 0.2 $cm^3$, and a total weight of 0.6 g. They are then respectively applied onto the surfaces of two objects that have relative sliding (i.e., a slider and a guide). The motion direction is perpendicular to the metal strips. Since the two metal gratings in the middle keep in contact, they form a common electrode called base electrode.

The following provides information regarding the making of this experimental embodiment:

Preparation of a slider. 1. Make mask that has hollow grating patterns. The mask material is thin acrylic sheet (1.5 mm thickness). The grating unit has length of 4 cm and width of 1 mm with interval of 1 mm in between. So the pitch size is 2 mm. The overall size of the grating pattern is 5 cm by 4 cm. Carved through the acrylic sheet to make the grating pattern become hollow; 2. Prepare a PTFE film with dimensions of 5 cm by 4 cm by 25 μm; 3. Place the PTFE film below the acrylic mask; 4. Treat the exposed PTFE surface with Argon plasma at power of 100 W for 30 seconds; 5. Deposit 20 nm of Ti by sputtering on the exposed surface of PTFE through the windows of the acrylic mask; 6. Subsequently deposit 500 nm of copper by sputtering; 7. Flip over the PTFE film and align the acrylic mask by shifting a half pitch perpendicular to the grating units, making grating patterns on opposite sides complementary; 8. Deposit 20 nm of Ti and then 500 nm of copper on the other side of the PTFE film; 9. Electrically connect lead wires to the two metal grating networks on both sides of the PTFE film; 10. Spread the PTFE flat out on the surface of an acrylic sheet; 11. Evenly spray water-based PTFE nanoparticle suspension on to the PTEF film, and dry by air blow.

Preparation of a guide. The process flow for fabricating a guide is similar to a slider. The difference is that the guide has larger length (15 cm) than the slider. Correspondingly, the acrylic mask and the PTFE thin film have larger length in the fabrication process. All other dimensions and processing remain the same.

Operation setup of the MG-TENG. 1. Fix the guide onto a flat stationary stage; 2. Put the slider onto the guide. PTFE thins films of the two parts are in contact; 3. Make alignment so that the linear grating on the slider is parallel to that on the guide; 4. Attached the slider to a linear motor, which can introduce relative motion between the slider and the guide; 5. The lead wires from the two metal gratings that in contact are connected, forming one output terminal. It is also called base electrode; 6. The lead wires from the other two metal gratings on the back of PTFE films are connected, forming another output terminal; 7. The two output terminals are connected to measurement system or electronics for electric measurement and applications, respectively.

The MG-TENG operates under a principle that relies on the coupling between triboelectric effect and electrostatic induction. It has a PTFE film with a metal electrode deposited on back side (back electrode). On front side, the PTFE film makes relative motion with another metal electrode (contact electrode). Since most metals tend to be more triboelectrically positive than PTFE, electrons are injected from metal into PTFE upon contact, producing negative triboelectric charges on PTFE surface and positive ones on metal surface. Triboelectric charges of opposite signs are completely balanced out. As the contact electrode slides apart, net electric field arises as a result of uncompensated triboelectric charges in the misaligned regions, driving free electrons from the back electrode to the contact electrode until the electric field is fully screened by induced charges on electrodes. If the contact electrode is brought back towards the alignment position, triboelectric charges are rebalanced, leading to a back flow of the induced free electrons.

Figure 17:
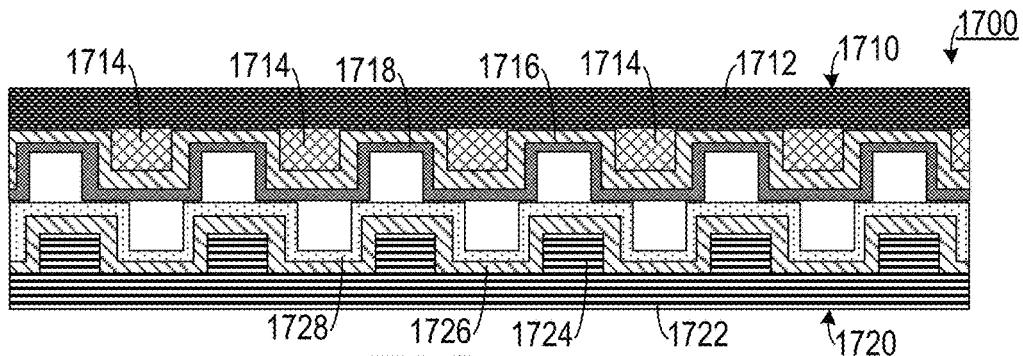
FIG. 17 is a schematic diagram (elevational view) of a self-powered triboelectric displacement sensor.

As shown in FIG. 17, a self-powered triboelectric displacement sensor 1700 includes a top member 1710 and a bottom member 1720. The top member 1710 includes a first substrate 1712 (such as a glass substrate) and a first micrograting base 1714 formed from a plurality of spaced-apart rows (such as rows made from SU-8) disposed on the first substrate separated by a corresponding plurality of spaced-apart troughs. A first conductive layer 1716 is disposed on the first micrograting base 1714 and the first substrate 1712 and can include a material such as ITO. A first dielectric layer 1718 (such as a parylene layer) is disposed on the first conductive layer 1716.

The bottom member 1720 includes a second substrate 1722 (such as a silicon substrate) that defines a second micrograting 1724 includes a plurality of spaced-apart rows separated by a corresponding plurality of spaced-apart troughs. A second conductive layer 1726 (such as an aluminum layer) is disposed on the second micrograting 1724. A second dielectric layer 1728 (such as an $SiO_2$ layer) is disposed on the second conductive layer 1726. The bottom member 1720 disposed adjacent to the top member 1710 so that the first dielectric layer 1718 is in contact with the second dielectric layer 1728 and so that the rows of the first micrograting 1714 run parallel to the rows of the second micrograting 1724. A charge imbalance occurs between the second conductive layer 1726 and the first conductive layer 1716 when lateral movement occurs between the first micrograting and the second micrograting in a direction transverse to the rows. The charge imbalance indicates an amount of lateral movement.

In one experimental embodiment of the device shown in FIG. 17, a self-powered, one-dimensional displacement and speed sensor using a pair of micro-grating structures achieved high resolution, large dynamic range and a long detecting distance. The sensor included a pair of micro grating structures and worked based on coupling of triboelectric effect and electrostatic induction. Relative motion between two gratings leads to periodic separation of two micro-grated dielectric materials that are oppositely charged through triboelectrification. As a result, an alternating electric signal between the metal electrodes placed beneath the dielectric materials can be detected due to electrostatic induction. The displacement and speed can be detected in real time by monitoring the open circuit (OC) voltage and short circuit (SC) current generated by the sensor itself, respectively. With a grating pair having a period of 200 µm, the displacement resolution of 173 nm was achieved in tens of millimeters working distance with a linearity error of 0.02%. The speed can be directly detected by the amplitude of the short circuit current, which has a good linearity over a large dynamic range from 5 µm/s to 0.1 m/s. The resolution for both displacement and speed sensing can be further improved by reducing the grating period.

In the experimental embodiment, the grating at the bottom (60 mm×30 mm) was made of an etched silicon wafer coated with aluminum as the bottom electrode and silicon dioxide as triboelectrically positive material; the grating on the top (30 mm×15 mm) was made of patterned SU-8 film (17 µm in thickness) on a glass slide as supporting substrate and subsequently coated with indium tin oxide (ITO) and a parylene film as the top electrode and triboelectrically negative material, respectively. Transparent materials were selected for the top grating to adjust the alignment between the two gratings. In working condition, the top grating slides within the scope of the bottom grating in a direction perpendicular to the grating strips.

When the two gratings are brought into contact with each other, charge transfer between the two surfaces takes place due to contact electrification, resulting in negative charges on parylene surface and positive charges on $SiO_2$ surface, because parylene is more triboelectrically negative. A relative sliding between the two gratings results in a separation of two tribo-charged surfaces. Therefore, an electrical potential between two metal electrodes underneath the tribo-charged material is built through electrostatic induction, which can be detected as open circuit (OC) voltage. If the two electrodes are connected through external circuits, the built-in voltage will drive electrons flowing from one electrode to the other when a short circuit (SC) current can be detected. For the first half cycle when the top micro-grating moves from overlap to separation position, the OC voltage and the amount of induced charge increases from zero to their maximums, and accordingly the SC current is positive; for the second half cycle when the top micro-grating moves from separation to overlap position, the OC voltage and the amount of induced charge decreases from their maximums to zero, and accordingly the SC current changes to be negative.

Continuous movement alternates the two oppositely charged surfaces between overlap and separation, thus generating an alternating OC voltage or SC current output. Therefore, by counting the number (n) of the voltage peaks and valleys (or the current zero-crossings), the displacement can be calculated to be nP/2, where P is the period of the grating. Benefited from the fact that the output signal originates from about 150 pitches that are in parallel, the sensor has large tolerance of any variation caused by non-uniform surface charge distribution, surface contamination or grating defects.

In the experimental embodiment, for the top grating, a SU-8 layer with thickness of 17 µm was spun coated on a glass slide and patterned to be one dimensional grating (width: 100 µm, period: 200 µm) using standard photolithography. Afterwards, the grating was cut into desired size (15 mm×30 mm for the presented device), followed by a sputtering of ITO (200 nm), and thermally coated with Parylene C (5 µm) using an STS parylene coater. For the bottom grating, a silicon (Si) wafer was etched into periodical trenches (100 µm in width and 100 µm in depth) with 200 µm period using standard inductively coupled plasma (ICP) etching methods with patterned NR9-1500PY negative photoresist (e.g., from Futurrex, Inc.) as etching mask. Then, a layer of Al (200 nm) was coated using DC sputter and $SiO_2$ (500 nm) deposited using plasma enhanced chemical vapor deposition (PECVD).

Figures 18A, 18B:
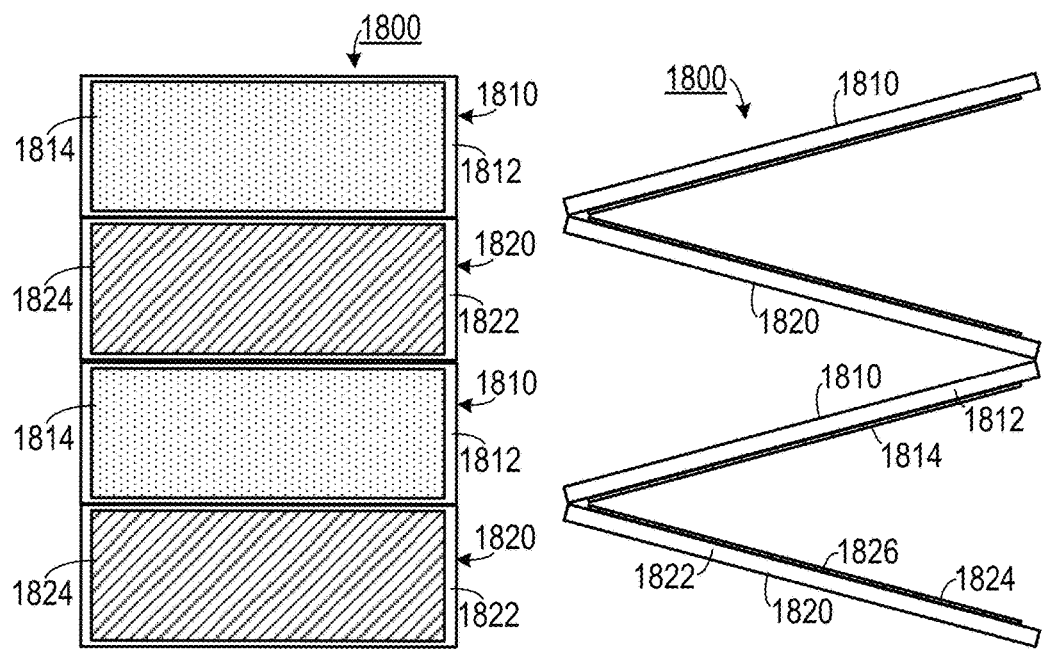
FIG. 18A is a schematic diagram (plan view) of one embodiment of a self-powered triboelectric generating element that is configured for use as a shoe parameter sensor.
FIG. 18B is a schematic diagram (elevational view) of the embodiment shown in FIG. 18A.

As shown in FIG. 18A-B, one embodiment of a generator 1800 for harvesting energy from a shoe having a sole includes at least one first triboelectric member 1810 and at least one second triboelectric member 1820. In one representative embodiment, the first triboelectric member 1810 includes a first substrate 1812 and an aluminum layer 1814 (to which a nanoscale texture may be applied to improve charge transfer efficiency) disposed on the first substrate 1812. The second triboelectric member 1824 includes a second substrate 1822, a PTFE layer 1824 (to which a nanoscale texture may also be applied to improve charge transfer efficiency) disposed on the first substrate 1822 and a copper electrode layer 1826 disposed between the second substrate 1822 and the PTFE layer 1824. The first member 1810 is hingedly attached to the second member 1820 and several pairs of these members can be attached to each other to form a zig-zag device (as shown in FIG. 18B). The natural springiness of the substrate materials at the joints maintain separation between the first triboelectric member 1810 and the second triboelectric member 1820 when the force is not applied therebetween.

Figure 19:
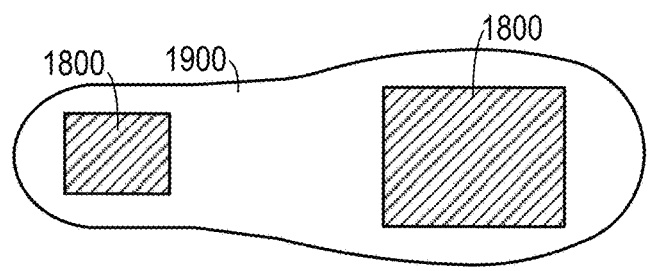
FIG. 19 is a schematic diagram of a shoe sole employing the embodiment shown in FIGS. 18A-B.

As shown in FIG. 19, this type of triboelectric generator 1800 can be placed in the sole 1900 of a shoe and used for powering devices (e.g., a cell phone). Several triboelectric generators 1800 can be used as sensors to detect characteristics of how the wearer of the shoe moves. For example, this embodiment could be used diagnostically as a sensor for sports training.

One experimental embodiment included a power-generating shoe insole with built-in flexible multi-layered triboelectric generators. The triboelectric generators were enclosed in an insole to harvest energy from foot pressure during normal walking Each of the triboelectric generators included three layers that were fabricated on a single flexible substrate that had a zigzag shape. Through parallel connection, electricity simultaneously produced from all of the three layers could add up together. Under pressure exerted from human body, each triboelectric generator could generate maximum open-circuit voltage of 220 V and short-circuit current of 600 µA. Equipped with this insole, a fully packaged self-lighting shoe was developed. Commercial LED bulbs were directly powered during normal walking.

In this experimental embodiment, one contact surface was polished aluminum foil, which also served as an electrode. The other contact surface was a PTFE thin film. Copper was applied to the back of the PTFE film as another electrode.

Surface morphology modification were performed on the aluminum foil through wet chemical etching to creating dense nano-pores (a nanoscale texture) for enhancing charge transfer with the PTFE film.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A triboelectric power system, comprising:
  (a) a triboelectric generator, wherein the triboelectric generator comprises:
    (i) a first dielectric layer;
    (ii) a first conductive electrode layer affixed to the first dielectric layer, the first electrode layer having a first position on a triboelectric series;
    (iii) a second dielectric layer having a second position on the triboelectric series that is different from the first position, the second dielectric layer spaced apart from the first conductive electrode layer; and
    (iv) a second conductive electrode layer affixed to the second dielectric layer on a side opposite from the first conductive electrode layer,
  the first conductive electrode layer and the second dielectric layer configured to remain spaced apart when the triboelectric generator is in a resting state and to come into contact with each other when a predetermined force is applied to the triboelectric generator, thereby causing a charge imbalance when the triboelectric generator returns to the resting state after the predetermined force has been applied so as to cause current flow from the triboelectric generator to the power management circuit;
  (b) a rechargeable energy storage unit associated with the triboelectric generator; and
  (c) a power management circuit configured to receive an input current from the triboelectric generator and to deliver an output current corresponding to the input current to the rechargeable energy storage unit so that the output current has a current direction and a voltage that will recharge the rechargeable energy storage unit.

2. The triboelectric power system of claim 1, further comprising a separating mechanism configured to maintain the triboelectric generator in the resting state unless the predetermined force is applied thereto.

3. The triboelectric power system of claim 1, wherein at least a selected on of each first conductive electrode layer and each second dielectric layer includes a nano-scale texture applied thereto.

4. The triboelectric power system of claim 1, wherein the rechargeable energy storage unit comprises an energy storage unit selected from a group of energy storage units consisting of: a rechargeable battery, a capacitor, a super capacitor, and combinations thereof.

5. The triboelectric power system of claim 1, wherein the rechargeable energy storage unit comprises a lithium ion battery that includes:
  (a) an aluminum electrode layer;
  (b) an $LiFePO_4$ layer disposed on the aluminum electrode layer;
  (c) a separator layer; and
  (d) a carbon fiber cloth layer including a plurality of carbon fibers and a plurality of $TiO_2$ nanowires extending from the carbon fibers.

6. The triboelectric power system of claim 1, wherein the power management circuit comprises a power management circuit selected from a group consisting of: a rectifier, an integrated power control circuit, a transformer, and combinations thereof.

7. A triboelectric power system, comprising:
  (a) a triboelectric generator;
  (b) a rechargeable energy storage unit associated with the triboelectric generator, wherein the rechargeable energy storage unit comprises a lithium ion battery that includes:
    (i) an aluminum electrode layer;
    (ii) an $LiFePO_4$ layer disposed on the aluminum electrode layer;
    (iii) a separator layer; and
    (iv) a carbon fiber cloth layer including a plurality of carbon fibers and a plurality of $TiO_2$ nanowires extending from the carbon fibers; and
  (c) a power management circuit configured to receive an input current from the triboelectric generator and to deliver an output current corresponding to the input current to the rechargeable energy storage unit so that the output current has a current direction and a voltage that will recharge the rechargeable energy storage unit.

8. The triboelectric power system of claim 7, wherein the triboelectric generator comprises:
  (a) a first dielectric layer;
  (b) a first conductive electrode layer affixed to the first dielectric layer, the first electrode layer having a first position on a triboelectric series;
  (c) a second dielectric layer having a second position on the triboelectric series that is different from the first position, the second dielectric layer spaced apart from the first conductive electrode layer;
  (d) a second conductive electrode layer affixed to the second dielectric layer on a side opposite from the first conductive electrode layer,
  the first conductive electrode layer and the second dielectric layer configured to remain spaced apart when the triboelectric generator is in a resting state and to come into contact with each other when a predetermined force is applied to the triboelectric generator, thereby causing a charge imbalance when the triboelectric generator returns to the resting state after the predetermined force has been applied so as to cause current flow from the triboelectric generator to the power management circuit.

9. The triboelectric power system of claim 8, further comprising a separating mechanism configured to maintain the triboelectric generator in the resting state unless the predetermined force is applied thereto.

10. The triboelectric power system of claim 8, wherein at least a selected on of each first conductive electrode layer and each second dielectric layer includes a nano-scale texture applied thereto.

11. The triboelectric power system of claim 7, wherein the rechargeable energy storage unit comprises an energy storage unit selected from a group of energy storage units consisting of: a rechargeable battery, a capacitor, a super capacitor, and combinations thereof.

12. The triboelectric power system of claim 7, wherein the power management circuit comprises a power management circuit selected from a group consisting of: a rectifier, an integrated power control circuit, a transformer, and combinations thereof.

13. A triboelectric power system, comprising:
(a) a triboelectric generator, wherein the triboelectric generator comprises:
   (i) a first dielectric layer;
   (ii) a first conductive electrode layer affixed to the first dielectric layer, the first electrode layer having a first position on a triboelectric series;
   (iii) a second dielectric layer having a second position on the triboelectric series that is different from the first position, the second dielectric layer spaced apart from the first conductive electrode layer; and
   (iv) a second conductive electrode layer affixed to the second dielectric layer on a side opposite from the first conductive electrode layer,
   the first conductive electrode layer and the second dielectric layer configured to remain spaced apart when the triboelectric generator is in a resting state and to come into contact with each other when a predetermined force is applied to the triboelectric generator, thereby causing a charge imbalance when the triboelectric generator returns to the resting state after the predetermined force has been applied so as to cause current flow from the triboelectric generator to the power management circuit;
(b) a rechargeable energy storage unit associated with the triboelectric generator; and
(c) a power management circuit configured to receive an input current from the triboelectric generator and to deliver an output current corresponding to the input current to the rechargeable energy storage unit so that the output current has a current direction and a voltage that will recharge the rechargeable energy storage unit, wherein at least a selected on of each first conductive electrode layer and each second dielectric layer includes a nano-scale texture applied thereto.

14. The triboelectric power system of claim 13, further comprising a separating mechanism configured to maintain the triboelectric generator in the resting state unless the predetermined force is applied thereto.

15. The triboelectric power system of claim 13, wherein the rechargeable energy storage unit comprises an energy storage unit selected from a group of energy storage units consisting of: a rechargeable battery, a capacitor, a super capacitor, and combinations thereof.

16. The triboelectric power system of claim 13, wherein the rechargeable energy storage unit comprises a lithium ion battery that includes:
(a) an aluminum electrode layer;
(b) an $LiFePO_4$ layer disposed on the aluminum electrode layer;
(c) a separator layer;
(d) a carbon fiber cloth layer including a plurality of carbon fibers and a plurality of $TiO_2$ nanowires extending from the carbon fibers.

17. The triboelectric power system of claim 13, wherein the power management circuit comprises a power management circuit selected from a group consisting of: a rectifier, an integrated power control circuit, a transformer, and combinations thereof.

* * * * *